(12) United States Patent
Lange et al.

(10) Patent No.: US 6,258,761 B1
(45) Date of Patent: *Jul. 10, 2001

(54) LUBRICATING OIL ADDITIVES

(75) Inventors: Richard M. Lange, Euclid; James R. Shanklin, Jr., Concord; Jeffry G. Dietz, University Hts.; Richard Yodice, Mentor; Naresh C. Mathur, Highland Hts., all of OH (US)

(73) Assignee: The Lubrizol Corporation, Wickliffe, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/329,891

(22) Filed: Jun. 10, 1999

(51) Int. Cl.⁷ .................................................. C10M 152/12
(52) U.S. Cl. .......................... 508/452; 508/222; 508/454; 508/470; 508/472; 525/327.7
(58) Field of Search .................................. 508/452, 454, 508/470, 472, 222; 525/327.7

(56) References Cited

U.S. PATENT DOCUMENTS

| | | | |
|---|---|---|---|
| 2,977,334 | 3/1961 | Zopf et al. | 260/27 |
| 2,992,987 | 7/1961 | Fields | 252/56 |
| 3,329,658 | 7/1967 | Fields | 260/78.5 |
| 3,449,250 | 6/1969 | Fields | 252/51.5 |
| 3,702,300 | 11/1972 | Coleman | 252/51.5 A |
| 3,933,761 | 1/1976 | Coleman | 260/78.5 T |
| 3,956,149 | * 5/1976 | Coleman | 525/327.6 |
| 3,959,159 | * 5/1976 | Coleman | 525/327.6 |
| 4,594,378 | 6/1986 | Tipton et al. | 524/106 |
| 4,604,221 | 8/1986 | Bryant et al. | 252/51.5 A |
| 5,157,088 | * 10/1992 | Dishong et al. | 525/327.6 |
| 5,670,462 | 9/1997 | Barr et al. | 508/291 |
| 5,707,943 | 1/1998 | Covitch | 508/466 |
| 5,716,912 | 2/1998 | Harrison et al. | 508/192 |
| 5,719,108 | 2/1998 | Wilby et al. | 508/232 |
| 5,821,205 | 10/1998 | Harrison et al. | 508/291 |
| 5,849,676 | 12/1998 | Harrison et al. | 508/291 |
| 5,851,965 | 12/1998 | Harrison et al. | 508/291 |
| 5,853,434 | 12/1998 | Harrison et al. | 44/331 |
| 5,872,083 | 2/1999 | Harrison et al. | 508/287 |

FOREIGN PATENT DOCUMENTS

| | | |
|---|---|---|
| 07594432A2 | 2/1997 | (EP) . |
| 0 773 234 A1 | 5/1997 | (EP) . |
| 08531155A1 | 7/1998 | (EP) . |
| 0882782A2 | 12/1998 | (EP) . |
| WO 93/09209 | 5/1993 | (WO) . |
| WO 98/05741 | 2/1998 | (WO) . |

* cited by examiner

*Primary Examiner*—Jacqueline V. Howard
(74) *Attorney, Agent, or Firm*—Joseph P. Fischer

(57) ABSTRACT

A composition prepared by reacting (A) an esterified carboxy-containing interpolymer, said interpolymer being derived from at least two monomers, (i) one of said monomers being at least one vinyl aromatic monomer and (ii) the other of said monomers being at least one alpha, beta-unsaturated acylating agent, and having, before esterification, $\bar{M}_n$ determined by gel permeation chromatography ranging from about 8,000 to about 350,000, wherein from about 80% to about 99% of the carboxylic groups of said interpolymer are esterified, wherein from about 80 to about 100% of the ester groups contain from 8 to about 23 carbon atoms and from 0 to about 20% of the ester groups contain from 2 to 7 carbon atoms, with (B) a hydrocarbyl substituted carboxylic acid or functional derivative thereof wherein the hydrocarbyl group comprises from about 10 to about 400 carbon atoms, and (C) an amine having an average of more than 1 condensable N—H group, in any order or simultaneously, or with the preformed reaction product of (B) and (C) wherein said preformed reaction product has at least one condensable N—H group. Depending upon the relative amounts of reactant (A) and (B) used, a composition which acts primarily as a viscosity improver with dispersant properties (DVM) or primarily as a dispersant with viscosity improving properties (VMD) may be prepared or compositions with properties intermediate between these.

40 Claims, No Drawings

LUBRICATING OIL ADDITIVES

FIELD OF THE INVENTION

This invention relates to performance improving additives for lubricating oils. In particular, the invention relates to additives useful for improving viscosity and dispersancy characteristics of lubricating oils.

BACKGROUND OF THE INVENTION

The viscosity of oils of lubricating viscosity is generally dependent upon temperature. As the temperature of the oil is increased, the viscosity usually decreases, and as the temperature is reduced, the viscosity usually increases.

The function of a viscosity improver is to reduce the extent of the decrease in viscosity as the temperature is raised or to reduce the extent of the increase in viscosity as the temperature is lowered, or both. Thus, a viscosity improver ameliorates the change of viscosity of an oil containing it with changes in temperature. The fluidity characteristics of the oil are improved.

Viscosity improvers are usually polymeric materials and are often referred to as viscosity index improvers.

Ester group containing polymers are well-known additives for improving the fluidity characteristic of lubricating oils. Polyacrylate, particularly polymethacrylate ester polymers, and esterified carboxy-containing intelpolymers are well-known and are widely used for this purpose.

Dispersants are also well-known in the lubricating art. Dispersants are employed in lubricants to keep impurities, particularly those formed during operation of mechanical devices such as internal combustion engines, automatic transmissions, etc. in suspension rather than allowing them to deposit as sludge or other deposits on the surfaces of lubricated parts.

Multifunctional additives that provide both viscosity improving properties and dispersant properties are likewise known in the art. Such products are described in numerous publications including Dieter Klamann, "Lubricants and Related Products", Verlag Chemie Gmbh (1984), pp 185–193; C. V. Smalheer and R. K. Smith "Lubricant Additives", Lezius-Hiles Co. (1967); M. W. Ranney, "Lubricant Additives", Noyes Data Corp. (1973), pp 92–145, M. W. Ranney, "Lubricant Additives, Recent Developments", Noyes Data Corp. (1978), pp 139–164; and M. W. Ranney, "Synthetic Oils and Additives for Lubricants", Noyes Data Corp. (1980), pp 96–166. Each of these publications is hereby expressly incorporated herein by reference.

It is desirable that the viscosity improver or dispersant viscosity improver not adversely affect the low-temperature viscosity of the lubricant containing same. Frequently, while many viscosity improvers or dispersant viscosity improvers enhance the high temperature viscosity characteristics of lubricating oil, that is, they reduce the loss of viscosity with increasing temperature, low temperature properties of the treated lubricant become worse.

One of the major requirements for automatic transmission fluids has been improved low temperature performance as demonstrated by a maximum Brookfield viscosity of 20,000 centipoise at −40° C. The viscosity modifier, which can comprise nearly 50 weight percent of the total additive system employed in an automatic transmission fluid can have a major impact on the low temperature performance. Such characteristics are also desirable in other applications such as in gear lubricants. The copolymers of this invention are also useful in many other lubricating oil compositions including, but not limited to engine oils, hydraulic oils, industrial oils, etc.

Various pour point depressants, additives which reduce the temperature at which oil will flow freely, have been developed and those to reach the commercial market have primarily been organic polymers, although some monomeric substances such as tetra (long chain alkyl) silicates, phenyl tristearyloxy-silane, and pentaerythritol tetrastearate have been shown to be effective. Presently available commercial pour point depressants are believed to be represented by the following types of polymeric materials: polymethacrylates, for example, copolymers of various chain length alkyl methacrylates (see, for example, U.S. Pat. No. 2,655,479); polyacrylamides (see, for example, U.S. Pat. No. 2,387,501); Friedel-Crafts condensation products of chlorinated paraffin wax with naphthalene (see, for example, U.S. Pat. Nos. 1,815,022 and 2,015,748); Friedel-Crafts condensation products of chlorinated paraffin wax with phenol (see, for example, U.S. Pat. No. 2,191,498); and vinyl carboxylate, such as dialkyl fumarate copolymers (see, for example, U.S. Pat. Nos. 2,666,746; 2,721,877 and 2,721,878).

Esters of maleic anhydride/alpha-olefin copolymers have been suggested as pour point depressants. For example, U.S. Pat. No. 2,977,334 describes the use of copolymers of maleic anhydride and ethylene which are esterified with low or high molecular weight alcohols and/or amidized with an amine. These resins are described as being useful as pour point modifiers, gelling agents, thickeners, viscosity improvers, etc., for mineral and synthetic oils including functional fluids and lubricating oils. U.S. Pat. No. 2,992,987 describes a class of lubricant additives useful as pour point depressants which are ethylene-maleic anhydride copolymers esterified to 80% or more, preferably 90–100%, with a mixture of straight-chain saturated hydrocarbon alcohols having from 8 to 24 carbon atoms. The unesterified carboxylic groups can be left unreacted or can be reacted with such materials as ethylene or propylene oxide alcohol esters, or lower-dialkyl-amino-lower-alkylene-amines. U.S. Pat. Nos. 3,329,658 and 3,449,250 describe copolymers of maleic anhydride and alpha-olefins such as ethylene, propylene, isobutylene or vinyl aromatic compounds such as styrene as being useful dispersancy and detergency additives for oils, as well as pour point depressants and viscosity index improvers. The copolymer is esterified to about 30 to about 95% with aliphatic alcohols or mixtures of alcohols having from 10 to 20 carbon atoms, and the remaining carboxyl groups are reacted with an amine of the following formula:

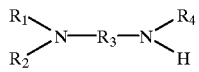

where $R_1$ and $R_2$ are selected from the group consisting of aliphatic hydrocarbon radicals having from 1 to 4 carbon atoms and the cyclohexyl radical, $R_3$ is an aliphatic hydrocarbon radical having from 2 to 4 carbon atoms, and $R_4$ is selected from the group consisting of hydrogen and aliphatic hydrocarbon radicals having from 1 to 4 carbon atoms.

U.S. Pat. Nos. 3,702,300 and 3,933,761 (Coleman) describe carboxy-containing interpolymers in which some of the carboxy radicals are esterified and the remaining carboxy radicals are neutralized by reaction with a polyamino compound having one primary or secondary amino group and at least one mono-functional amino group, and indicate that such interpolymers are useful as viscosity index improving and anti-sludge agents in lubricating compositions and fuels. The patentee indicates that it is critical that the mixed esters described in these patents include both relatively high molecular weight carboxylic ester groups having at least eight aliphatic carbon atoms in the ester radical and relatively low molecular weight carboxylic ester groups having no more than seven aliphatic carbon atoms in the ester radical.

U.S. Pat. No. 4,604,221 (Bryant et al) relates to interpolymers similar to those described in the aforementioned '300 and '761 patents, except the ester groups contain at least 8 carbon atoms in the ester radical.

U.S. Pat. No. 5,124,059 (Koch et al) describes esters of similar interpolymers characterized by the presence within its polymeric structure of the following groups which are derived from carboxy groups of said interpolymer:

(A) at least one carboxylic ester group having at least 8 aliphatic carbon atoms in the ester group;

(B) at least one carboxylic ester group having an ester group of the formula

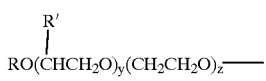

wherein R is a hydrocarbyl group of about 1 to about 50 carbon atoms, R' is a hydrocarbyl group of about 1 to about 50 carbon atoms, y is a number in the range of zero to about 50 and z is a number in the range of zero to about 50 with the proviso that both y and z cannot be zero; and optionally (C) at least one carboxylic ester group having no more than 7 aliphatic carbon atoms in the ester group.

U.S. Pat. No. 3,956,149 issued to Coleman relates to a lubricant or fuel composition containing a nitrogen-containing ester of a carboxy-containing interpolymer.

U.S. Pat. No. 3,959,159 issued to Coleman relates to lubricating compositions containing a nitrogen-containing mixed ester of a carboxy-containing interpolymer.

U.S. Pat. No. 4,284,414 issued to Bryant relates to a crude oil composition containing mixed alkyl esters of a carboxy-containing interpolymer.

U.S. Pat. No. 4,180,637 issued to Evani et al. relates to a process for preparing a low molecular weight carboxy-containing copolymer.

U.S. Pat. No. 4,200,720 issued to Evani et al. relates to a process for preparing a low molecular weight carboxy-containing interpolymer.

U.S. Pat. No. 3,085,994 issued to Muskat relates to a carboxy-containing interpolymer.

U.S. Pat. No. 3,388,106 issued to Muskat relates to a process for making a carboxy-containing interpolymer.

U.S. Pat. No. 3,392,155 issued to Muskat relates to a polyoxy alkylene glycol ester of a carboxy-containing interpolymer.

U.S. Pat. No. 5,157,088 (Dishong et al) relates to nitrogen-containing esters of carboxy-containing interpolymers having relatively low inherent viscosity.

U.S. Pat. No. 4,088,589 relates to lubricating oils blended from petroleum distillates and, if desired, a bright stock containing waxy or wax-like components and modified by the presence of copolymeric ethylene-higher alpha-olefins viscosity index improving agents, having their low temperature performance improved when said copolymer contains a minor weight proportion of ethylene by the addition of from 0.15 to 1%, based on the total weight of said lubricating oil composition of a combination of pour point depressants comprising: (a) from about 0.05 to about 0.75 wt. % of an oil-soluble condensation product of a chlorinated wax of from 10 to 50 carbon atoms and a mono- or dinuclear aromatic compound; and (b) from 0.05 to 0.75 wt. % of an oil soluble polymer of $C_{10-18}$ alkyl acrylate and/or an interpolymer of a vinyl alcohol ester of a $C_2$ to $C_{18}$ alkanoic acid and di-($C_4$–$C_{18}$ alkyl) fumarate.

The Society of Automotive Engineers (SAE) has issued a standard, J-300 (December 1995), which defines limits for classification of engine lubricating oils in rheological terms. This standard contains limits for various engine oil viscosity grades. Also included in the standard are discussions of low temperature and of high temperature test methods.

Dispersant-viscosity improvers are frequently prepared by functionalizing, i.e., adding polar groups, to a hydrocarbon polymer backbone.

Hayashi, et al, U.S. Pat. No. 4,670,173 relates to compositions suitable for use as dispersant-viscosity improvers made by reacting an acylating reaction product which is formed by reacting a hydrogenated block copolymer and an alpha-beta olefinically unsaturated reagent in the presence of free-radical initiators, then reacting the acylating product with a primary amine and optionally with a polyamine and a mono-functional acid.

Chung et al., U.S. Pat. No. 5,035,821 relates to viscosity index improver-dispersants comprised of the reaction products of an ethylene copolymer grafted with ethylenically unsaturated carboxylic acid moieties, a polyamine having two or more primary amino groups or polyol and a high functionality long chain hydrocarbyl substituted dicarboxylic acid or anhydride.

Van Zon et al., U.S. Pat. No. 5,049,294, relates to dispersant/VI improvers produced by reacting an a alpha-beta unsaturated carboxylic acid with a selectively hydrogenated star-shaped polymer then reacting the product so formed with a long chain alkane-substituted carboxylic acid and with a $C_1$ to $C_{18}$ amine containing 1 to 8 nitrogen atoms and/or with an alkane polyol having at least two hydroxy groups or with the preformed product thereof.

Bloch et al., U.S. Pat. No. 4,517,104, relates to oil soluble viscosity improving ethylene copolymers reacted or grafted with ethylenically unsaturated carboxylic acid moieties then with polyamines having two or more primary amine groups and a carboxylic acid component or the preformed reaction product thereof.

Gutierrez et al., U.S. Pat. No. 4,632,769, describes oil-soluble viscosity improving ethylene copolymers reacted or grafted with ethylenically unsaturated carboxylic acid moieties and reacted with polyamines having two or more primary amine groups and a $C_{22}$ to $C_{28}$ olefin carboxylic acid component.

Steckel, U.S. Pat. No. 5,160,648 describes dispersant materials prepared by reacting highly condensed polyamines with carboxylic reactants and phenolic reactants.

Covitch, U.S. Pat. No. 5,707,943 describes mixtures of esterified carboxy-containing interpolymers, wherein residual acidity of the esterified interpolymers may be neutralized by reaction with an amine, and additive concentrates and lubricating oil compositions containing same.

Harrison et al in U.S. Pat. Nos. 5,821,205; 5,849,676; 5,851,965; 5,853,434 and 5,872,083 describe a succinimide composition prepared by reacting a mixture of an alkenyl or alkylsuccinic acid derivative, an unsaturated acidic reagent copolymer, and a polyamine under reactive conditions. The alkenyl or alkyl substituent of the alkenyl or alkylsuccinic acid derivative has $\overline{M}n$ of from 1000 to 5000. The unsaturated acidic reagent copolymer is a copolymer of an unsaturated acidic reagent and an alkylene group. The alkylene group can be an α-olefin having 8 to 42 carbon atoms, a polyalkylene having from 8 to 28 carbon atoms, ethylene, styrene, 1,3-butadiene, vinyl alkyl ether having at least 3 carbon atoms, or vinyl alkanoate having at least 4 carbon atoms. The polyamine has at least 3 nitrogen atoms and 4 to 20 carbon atoms. The mixture contains from 0.5 to 10 equivalents of the alkenyl or alkylsuccinic acid derivative per equivalent of unsaturated acidic reagent copolymer and from 0.4 to 1.0 moles of polyamine per equivalent of alkenyl or alkylsuccinic acid derivative plus unsaturated acidic reagent copolymer.

Harrison et al in U.S. Pat. No. 5,716,912; describe a succinimide composition prepared by reacting a mixture of an alkenyl or alkylsuccinic acid derivative, an unsaturated acidic reagent copolymer, and a polyamine under reactive conditions; then treating the reaction product with either a cyclic carbonate or a linear mono- or polycarbonate or boron compound under reactive conditions. The alkenyl or alkyl substituent of the alkenyl or alkylsuccinic acid derivative has a $\overline{M}n$ of from 1800 to 3000. The unsaturated acidic reagent copolymer has a $\overline{M}n$ of from 2000 to 4800, and is a copolymer of an unsaturated acidic reagent and an olefin having an average of from 14 to 30 carbon atoms. The polyamine has at least 3 nitrogen atoms and 4 to 20 carbon atoms. The mixture contains from 1.5 to 10 equivalents of the alkenyl or alkylsuccinic acid derivative per equivalent of unsaturated acidic reagent copolymer and from 0.4 to 1.0 moles of polyamine per equivalent of alkenyl or alkylsuccinic acid derivative plus unsaturated acidic reagent copolymer.

Barr et al, (U.S. Pat. No. 5,670,462) discloses a process which comprises reacting at an elevated temperature a copolymer of an olefin and a monomer having the structure

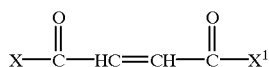

(I)

wherein X and $X^1$ are the same or different provided that at least one of X and $X^1$ is such that the copolymer can function as a carboxylic acylating agent and a succinimide prepared from an acyclic hydrocarbyl substituted succinic acylating agent and a polyamine.

Wilby et al., (U.S. Pat. No. 5,719,108) disclose dispersant viscosity improvers for lubricating oils which comprise the reaction product of a copolymer of octadecene-1 and maleic anhydride, said copolymer having a number average molecular weight from greater than 6300 to less than 12000 and a succinimide prepared from a polyamine and an acyclic succinic acylating agent of the formula

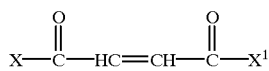

(I)

wherein X and $X^1$ are the same or different provided that at least one of X and $X^1$ is such that the copolymer can function as a carboxylic acylating agent and optionally a primary or secondary hydrocarbyl monoamine., and optionally a compound having at least two primary or secondary amino groups separated by at least 3 carbon atoms.

SUMMARY OF THE INVENTION

It is desirable to enable the formulator to prepare compositions which provide a broad spectrum of performance benefits. The instant invention relates to a composition prepared by reacting (A) an esterified carboxy-containing interpolymer, said interpolymer being derived from at least two monomers, (i) one of said monomers being at least one vinyl aromatic monomer and (ii) the other of said monomers being at least one alpha, beta-unsaturated acylating agent, and having, before esterification, number average molecular weight ($\overline{M}_n$) determined by gel permeation chromatography ranging from about 8,000 to about 350,000, wherein from about 80 to about 99% of the carboxylic groups of said interpolymer are esterified, wherein from about 80 to about 100% of the ester groups contain from 8 to about 23 carbon atoms and from 0 to about 20% of the ester groups contain from 2 to 7 carbon atoms, with (B) a hydrocarbyl substituted carboxylic acid or functional derivative thereof wherein the hydrocarbyl group comprises from about 10 to about 400 carbon atoms, and (C) an amine having an average of more than 1 condensable N—H group, in any order or simultaneously, or with the preformed reaction product of (B) and (C) wherein said preformed reaction product has at least one condensable N—H group.

Depending upon the relative amounts of reactant (A) and (B) used, a composition which acts primarily as a viscosity improver with dispersant properties (DVM) or primarily as a dispersant with viscosity improving properties (VMD) may be prepared. Compositions with properties intermediate between these are also possible. Thus, compositions can be custom made for specific applications.

DETAILED DESCRIPTION OF THE PREFERRED EMBODIMENTS

It is to be understood that the expression "before esterification" when used in reference to the carboxy containing interpolymer includes reference to an interpolymer which may be derived from one or more ester group containing monomers, but which has not been subjected to further esterification such that at least about 80% of the carboxylic groups of the interpolymer are esterified.

As used herein, the terms "hydrocarbon", "hydrocarbyl" or "hydrocarbon based" mean that the group being described has predominantly hydrocarbon character within the context of this invention. These include groups that are purely hydrocarbon in nature, that is, they contain only carbon and hydrogen. They may also include groups containing substituents or atoms which do not alter the predominantly hydrocarbon character of the group. Such substituents may include halo-, alkoxy-, nitro-, etc. These groups also may contain hetero atoms. Suitable hetero atoms will be apparent to those skilled in the art and include, for example, sulfur, nitrogen and oxygen. Therefore, while remaining predominantly hydrocarbon in character within the context of this invention, these groups may contain atoms other than carbon present in a chain or ring otherwise composed of carbon atoms provided that they do not adversely affect reactivity or utility of the process or products of this invention.

In general, no more than about three non-hydrocarbon substituents or hetero atoms, and preferably no more than one, will be present for every 10 carbon atoms in the hydrocarbon or hydrocarbon based groups. Most preferably, the groups are purely hydrocarbon in nature, that is, they are essentially free of atoms other than carbon and hydrogen.

Throughout the specification and claims the expression oil soluble or dispersible is used. By oil soluble or dispersible is meant that an amount needed to provide the desired level of activity or performance can be incorporated by being dissolved, dispersed or suspended in an oil of lubricating viscosity. Usually, this means that at least about 0.001% by weight of the material can be incorporated into a lubricating oil. For a further discussion of the terms oil soluble and dispersible, particularly "stably dispersible", see U.S. Pat. No. 4,320,019 which is expressly incorporated herein by reference for relevant teachings in this regard.

The expression "lower" is used throughout the specification and claims. As used herein to describe various groups, the expression "lower" is intended to mean groups containing no more than 7 carbon atoms, more often, no more than 4, frequently one or two carbon atoms.

It must be noted that as used in this specification and appended claims, the singular forms also include the plural unless the context clearly dictates otherwise. Thus the singular forms "a", "an", and "the" include the plural; for example "a monomer" includes mixtures of monomers of the same type. As another example the singular form "monomer" is intended to include both singular and plural unless the context clearly indicates otherwise.

In the context of this invention the terms "interpolymer" and "copolymer" mean a polymer derived from two or more different monomers. Thus, a polymer derived from a mixture of, for example, methyl-, butyl-, $C_{9-11}$-, and $C_{12-18}$-methacrylates, or a polymer having two or more distinct blocks, is an interpolymer or copolymer as defined herein. The copolymers of this invention also may contain units derived from nitrogen-containing monomers.

The expression "substantially inert" is used in reference to diluents. When used in this context, "substantially inert" means the diluent is essentially inert with respect to any reactants or compositions of this invention, that is, it will not, under ordinary circumstances, undergo any significant reaction with any reactant or composition, nor will it interfere with any reaction or composition of this invention.

The expression viscosity index (often abbreviated VI), is frequently used herein. Viscosity index is an empirical number indicating the degree of change in viscosity within a given temperature range. A high VI signifies an oil that displays a relatively small change in viscosity with temperature.

As used in the specification and claims, the term carboxy-containing refers to polymers which are prepared using a carboxy-containing monomer. The carboxy-containing monomer is polymerized with other monomers to form the carboxy-containing interpolymer. Since the carboxy-containing monomer is incorporated into the polymer backbone, the carboxy groups extend from the polymer backbone, e.g., the carboxy groups are directly attached to, pendant from, the polymer backbone.

In reference to the size of the ester groups, it is pointed out that an ester group is represented by the formula

—C(O)(OR)

and that the number of carbon atoms in an ester group is thus the combined total of the carbon atom of the carbonyl group and the carbon atoms of the (OR) group. Thus, methyl methacrylate contains two carbon atoms in the ester group. A butyl ester contains five carbon atoms in the ester group.

Amounts of reactive components used to prepare the compositions of this invention are expressed in terms of moles or of equivalents. A mole of a compound is its formula weight, or for a polymer, its $\overline{M}_n$. It is often convenient to express amounts in terms of equivalents which relate to amounts of reactive moiety present in a reactant.

(A) The Esterified Interpolymer

Reactant (A) is an esterified carboxy containing interpolymer. The interpolymer is described in greater detail hereinbelow.

From about 80%, often from about 85% frequently from about 92% up to about 99%, often to about 97% of the carboxy groups of the interpolymer are esterified, wherein from about 80 to about 100% of the ester groups contain from 8 to about 23 carbon atoms and from 0 to about 20% of the ester groups contain from 2 to 7 carbon atoms.

In one embodiment esterified groups of interpolymer (A) are characterized by the presence of at least one member of the group consisting of (a) pendant ester groups containing from about 12 to about 23 carbon atoms, and (b) pendant ester groups containing from 8 to about 11 carbon atoms; and optionally, (c) up to about 20 mole % of pendant ester groups containing from 2 to 7 carbon atoms, based on the total number of moles of carboxylic groups in said interpolymer. In particular, said esterified groups of interpolymer (A) are characterized by the presence of each of the following groups which are derived from the carboxy groups of said interpolymer: (a) from about 20 to about 80 mole % of pendant ester groups containing from about 12 to about 23 carbon atoms, (b) from about 80 to about 20 mole % of pendant ester groups containing from 8 to about 11 carbon atoms, and optionally, (c) up to about 20 mole % of pendant ester groups containing from 2 to 7 carbon atoms, all based on the total number of moles of carboxylic groups in said interpolymer.

In a particular embodiment, the esterified carboxy containing interpolymer (A) comprises from 1 up to about 20 mole % based on moles of carboxylic groups in said interpolymer of pendant carboxylic acid or anhydride groups. In a particular embodiment, the esterified interpolymer (A) is substantially free of ester groups containing from 2 to 7 carbon atoms.

The esterified interpolymer may be obtained by a number of means. In one embodiment, the interpolymer is prepared from carboxy containing monomers essentially free of ester groups, comprising primarily carboxylic acid or anhydride groups, which interpolymer is then reacted with alcohols to prepare the desired ester. In another embodiment, some of the interpolymer comprises ester groups when the interpolymer is prepared from monomers comprising ester groups. The interpolymer also contains carboxylic acid and anhydride groups. Some or all of the ester groups may be replaced with the desired ester groups via transesterification with alcohols. In yet another embodiment, the interpolymer is prepared from ester-containing monomers having the desired number of carbon atoms in the ester group.

Methods for obtaining carboxy containing interpolymers and ester formation therefrom are given in greater detail hereinbelow.

The Interpolymer

The carboxy-containing interpolymers useful in preparing the esters useful in the invention are copolymers, terpolymers, and other interpolymers of at least two monomers, (i) one of said monomers being at least one vinyl aromatic monomer and (ii) the other of said monomers being at least one alpha, beta-unsaturated acylating agent, typically a carboxylic acid or derivative thereof, and having before esterification, $\overline{M}_n$ determined by gel permeation chromatography ranging from about 8,000 to about 350,000. The derivatives of the carboxylic acid are derivatives which are polymerizable with (i) the vinyl aromatic monomers, and as such may be the esters, especially lower alkyl esters, e.g., those containing from 2 to 7 carbon atoms in the ester alkyl group, especially 2 carbon atoms, halides and anhydrides of the acids. The molar ratio of (i) to (ii) ranges from about 1:2 to about 3:1, preferably about 1:1. The carboxy-containing interpolymer is prepared by polymerizing the vinyl aromatic monomer with the alpha, beta-unsaturated carboxylic acid or derivative thereof.

Mixtures of two or more compatible (i.e., nonreactive to one another) interpolymers which are separately prepared are contemplated herein for use in preparation of the esterified interpolymer. Thus, as used herein, and in the appended claims, the terminology "interpolymer" refers to either one separately prepared interpolymer or a mixture of two or more of such interpolymers. A separately prepared interpolymer is one in which the reactants and/or reaction conditions are different from the preparation of another interpolymer.

Procedures for preparing the interpolymers are well known and are described in detail in many publications including the aforementioned patents by Coleman, Bryant and Dishong, which are hereby incorporated herein by reference for relevant disclosures of such procedures.

Still another important element of the present invention is the molecular weight of the carboxy-containing interpolymer before esterification. Useful interpolymers before esterification have number average molecular weight ($\overline{M}_n$) determined by gel permeation chromatography ranging from about 8,000 to about 350,000, preferably ranging from about 10,000 to about 200,000 often to about 100,000. It is important that the method for determining molecular weight is reliable, being consistently repeatable.

As noted, molecular weights of the interpolymers are determined by gel permeation chromatography (GPC). As is well known, this method is also known as size-exclusion chromatography. This separation method involves column chromatography in which the stationary phase is a heteroporous, solvent-swollen polymer network of a polystyrene gel varying in permeability over many orders of magnitude. The mobile phase is typically tetrahydrofuran. As the mobile phase containing the polymer sample passes through the gel, the polymer molecules diffuse in and out of the pores of the gel. Smaller molecules diffuse or permeate more completely resulting in a longer residence time; larger molecules permeate less and elute from the columns more rapidly. The molecular weight distribution of the interpolymers can be obtained by one of skill in the art by relating the molecular weights of calibration standards to the elution curve of the interpolymer. For the purpose of this invention a series of narrow dispersity polystyrenes is used for calibration.

Some interpolymers may interact with the column material, resulting in adsorption of the polymer. As noted hereinabove, the permeation of the interpolymer to varying degrees results in the separation of the molecules making up the polymer. However, when the interpolymer interacts with the column packing, the ability of the polymer to permeate the columns is retarded. Since size exclusion chromatography relies upon the ability of the polymeric species to permeate the column materials and to elute from the column, any interaction with the column preventing this permeation adversely affects the molecular weight distribution. Possible polymer adsorption can be prevented by the addition of acetic acid to the mobile phase.

Instrumentation for determining molecular weights of the interpolymers includes a Waters 2690 separations module, an Eppendorf CH-460 multiple column heater (500 watt) with TC-55 dual channel heater control, Waters 410 Differential Refractometer and Waters Millenium Gel Permeation Chromatography (GPC) software for data acquisition and processing. Columns are 3× PLgel 5 µm Mixed C (excl. limit ~6 M); 300×7.5 mm; Cat. #1110-6500 and 1× PLgel 5 µm 100A; 300×7.5 mm; Cat #1110-6520.

The GPC method used herein involves preconditioning the columns with the acetic acid containing tetrahydrofuran solvent. This conditioning results in the reduction of adverse interactions of the solute with polar sites on the column. Consistently repeatable molecular weight distributions are produced using this procedure.

Literature references relating to styrene-maleic anhydride copolymers and characterization thereof include Tacx, J. C. J. F et al, Polymer, Vol. 37, 4307–4310 (1996);

Chow, C. D., J. Applied Poly. Sci., Vol. 20, 1619–1626 (1976); and

Baruah, S. D. et al, ibid., Vol. 60, 649–658 (1996).

These are hereby expressly incorporated herein by reference for relevant disclosures contained therein.

Vinyl Aromatic Monomers

Suitable vinyl aromatic monomers which can be polymerized with the alpha, beta-unsaturated acylating agents include styrene and the substituted styrenes although other vinyl aromatic monomers such as vinyl naphthalenes can also be used. The substituted styrenes include styrenes that have halo-, alkoxy-, carboxy-, hydroxy-, sulfonyl-, hydrocarbyl- wherein the hydrocarbyl group has from 1 to about 12 carbon atoms and other substituents. Exemplary of the hydrocarbyl-substituted styrenes are alpha-methylstyrene, para-tert-butylstyrene, alpha-ethylstyrene, and para-lower alkoxy styrene. Mixtures of two or more vinyl aromatic monomers can be used. Styrene is preferred.

Alpha,Beta-Unsaturated Acylating Agent

Suitable alpha, beta-unsaturated acylating agents useful in the preparation of the interpolymers are represented by carboxylic acids, anhydrides, halides, or esters, especially lower alkyl esters thereof. These include mono-carboxylic acids (e.g., acrylic acid, methacrylic acid, etc. or lower alkyl esters thereof, as well as dicarboxylic acids, anhydrides or lower alkyl esters thereof wherein a carbon-to-carbon double bond is in an alpha, beta-position to at least one of the carboxy functions (e.g., itaconic acid, anhydride or lower esters thereof, cc-methylene glutaric acid or esters thereof,) and preferably in an alpha, beta-position to both of the carboxy functions of the alpha, beta-dicarboxylic acid, anhydride or the lower alkyl ester thereof (e.g., maleic acid or anhydride, fumaric acid, or lower alkyl esters thereof). Normally, the carboxy functions of these compounds will be separated by up to about 4 carbon atoms, preferably about 2 carbon atoms.

A class of preferred alpha,beta-unsaturated dicarboxylic acid, anhydrides or the lower alkyl esters thereof, includes those compounds corresponding to the formulae:

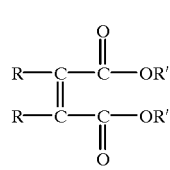

(I)

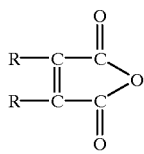
(II)

(including the geometric isomers thereof, i.e., cis and trans) wherein each R is independently hydrogen; halogen (e.g., chloro, bromo, or iodo); hydrocarbyl or halogen-substituted hydrocarbyl of up to about 8 carbon atoms, preferably alkyl, alkaryl or aryl; (preferably, at least one R is hydrogen, more preferably, both R are hydrogen); and each R' is independently hydrogen or lower alkyl of up to about 7 carbon atoms (e.g., methyl, ethyl, butyl or heptyl). These alpha, beta-unsaturated dicarboxylic acids, anhydrides or alkyl esters thereof contain a total carbon content of up to about 25 carbon atoms, normally up to about 15 carbon atoms. Examples include maleic acid or anhydride; benzyl maleic anhydride; chloro maleic anhydride; heptyl maleate; itaconic acid or anhydride; ethyl fumarate; fumaric acid, mesaconic acid; ethyl isopropyl maleate; isopropyl fumarate; hexyl methyl maleate; phenyl maleic anhydride and the like. These and other alpha, beta-unsaturated dicarboxylic compounds are well known in the art. Maleic anhydride, maleic acid and fumaric acid and the lower alkyl esters thereof are preferred. Interpolymers derived from the mixtures of two or more of any of these can also be used.

Alternatively, the (OR') group in the above formula may contain more than 7 carbon atoms, being derived from a mixture of alcohols, some containing over 7 carbon atoms, and in such instances, the ester group may remain attached to the carboxy group during and after formation of the interpolymer. This procedure provides a method of introducing the desirable ester groups initially, and eliminates the need to introduce the ester groups in a separate subsequent step.

In another preferred embodiment, the alpha,beta,-unasaturated agent compising a mixture of two or more components. Thus, interpolymers prepared from reaction mixtures wherein (ii) comprises 2 or more, usually up to 4, preferably 2, different alpha-beta unsaturated acylating agents are contemplated. A non-limiting example might be a mixture of maleic acid or anhydride with esters of acrylic acids. Other mixtures are contemplated.

When (ii) comprises a mixture of monomeric components, they may be present in any amounts relative to one another. However, it is preferred that one of the components is present in a major amount, i.e., more than 50 mole % of the mixture. In an especially preferred embodiment, the total amount of additional components is present in amounts ranging from about 0.005 to about 0.3 moles, per mole of major component, more often from about 0.01 to about 0.15 moles, preferably from about 0.03 to about 0.1 moles minor component per mole of major component.

Examples of preferred mixtures of acylating agents are maleic acid or anhydride with esters of acrylic acids, especially esters of methacrylic acid. Preferred esters are lower alkyl esters. An especially preferred mixture of acylating agents is one containing maleic anhydride and lower alkyl esters of methacrylic acid. Especially preferred is a mixture of maleic anhydride and methyl or ethyl, preferably methyl, methacrylate.

Particularly preferred esters used in the compositions of this invention are those of interpolymers made by reacting maleic acid, or anhydride or the lower esters thereof with styrene. Copolymers of maleic anhydride and styrene, and particularly those having a molar ratio of maleic anhydride to styrene of about 1:1 are especially preferred. They can be prepared according to methods known in the art, as for example, free radical initiated (e.g., by benzoyl peroxide) solution polymerization. Examples of such suitable interpolymerization techniques are described in U.S. Pat. Nos. 2,938,016; 2,980,653; 3,085,994; 3,342,787; 3,418,292; 3,451,979; 3,536,461; 3,558,570; 3,702,300; 3,723,375; 3,933,761; 4,284,414, and 4,604,221. These patents are incorporated herein by reference for their teaching of the preparation of suitable maleic anhydride and styrene containing interpolymers. Other preparative techniques are known in the art.

The carboxy-containing interpolymers may also be prepared using one or more additional interpolymerizable comonomers. The additional comonomer is present in relatively minor proportions. Generally, the total amount is less than about 0.3 mole, usually less than about 0.15 mole of additional comonomers for each mole of either the olefin or the alpha,beta-unsaturated carboxylic acylating agent. Examples of additional comonomers include acrylamides, acrylonitrile, vinyl pyrrolidinone, vinyl pyridine, vinyl ethers, and vinyl carboxylates. In one embodiment, the additional comonomers are vinyl ethers or vinyl carboxylates.

Vinyl ethers are represented by the formula $R_1$—CH=CH—$OR_2$ wherein each $R_1$ is hydrogen or a hydrocarbyl group having 1 to about 30, or to about 24, or to about 12 carbon atoms and $R_2$ is a hydrocarbyl group having 1 to about 30 carbon atoms, or to about 24, or to about 12. Examples of vinyl ethers include methyl vinyl ether, propyl vinyl ether, 2-ethylhexyl vinyl ether and the like.

The vinyl ester of a carboxylic acid may be represented by the formula $R_3CH=CH—O(O)CR_4$ wherein $R_3$ is a hydrogen or hydrocarbyl group having from 1 to about 30, or to 12 carbon atoms, or just hydrogen, and $R_4$ is a hydrocarbyl group having 1 to about 30, or to about 12, or to about 8. Examples of vinyl esters include vinyl acetate, vinyl 2-ethylhexanoate, vinyl butanoate, vinyl crotonate. Vinyl carboxylates include vinyl acetate, vinyl butanoate, etc.

The molecular weight of such interpolymers can be adjusted to the range required in this invention, if necessary, according to conventional techniques, e.g., control of the reaction conditions.

As noted above, interpolymers are prepared from a vinyl aromatic monomer and an aliphatic carboxylic acid or anhydride and esters thereof.

Preferred vinyl aromatic monomers are styrene or a substituted styrene (either ring substituted or substituted on the aliphatic —C=C group), most preferably, styrene.

Preferred aliphatic carboxylic acids or anhydrides and esters thereof are at least one member selected from the group consisting of maleic acid or anhydride, itaconic acid or anhydride, fumaric acid, α-methylene glutaric acid, acrylic acid, methacrylic acid or an ester, especially a lower alkyl ester, more preferably a methyl ester, thereof.

In one particularly preferred embodiment the interpolymer is derived from styrene and maleic anhydride. In another preferred embodiment the interpolymer is derived from styrene, maleic anhydride and methacrylic acid or an ester thereof.

In the latter preferred embodiment, the mole ratio of styrene:maleic anhydride:methacrylic acid or ester thereof ranges from about (1–3):(2–1):(0.01–0.3), preferably from about (1–2):(1.5–1):(0.01–0.03), more preferably from 1:1:(0.03–0.08), most preferably from 1:1:0.05.

Esterification

As noted herein, component (A) is an esterified carboxy-containing interpolymer. Esterification (or transesterification, when the interpolymer comprises ester groups) of the interpolymers can be accomplished by heating any of the interpolymers (having the requisite molecular weight) and the desired alcohol(s) and alkoxylate(s) under conditions typical for effecting esterification. Such conditions include, for example, a temperature of at least about 80° C., but more preferably up to about 150° C. or even higher, provided that the temperature is maintained at a level below the decomposition point of the reaction mixture or products thereof. Water or lower alcohol is normally removed as the esterification proceeds. These conditions may optionally include the use of a substantially inert, normally liquid, organic solvent or diluent such as mineral oil, toluene, benzene, xylene or the like and an esterification catalyst such as toluenesulfonic acid, sulfuric acid, aluminum chloride, boron trifluoride-triethylamine, methanesulfonic acid, hydrochloric acid, ammonium sulfate, phosphoric acid, sodium methoxide, Sn(II) 2-ethylhexanoate and the like. These conditions and variations thereof are well known in the art.

In one embodiment, the interpolymer may be prepared from monomers comprising ester groups. In one embodiment, the esterified interpolymer (A) may be prepared directly from ester containing monomers or a mixture of monomers containing both esterified and non-esterified monomers. An example of such a mixture is maleic anhydride and an acrylic ester, such as methyl methacrylate. In the event the interpolymer is prepared entirely from ester containing monomers, it is necessary that the interpolymer is subjected to hydrolysis conditions such that from about 80% to about 99% of the carboxylic groups in the interpolymer remain esterified.

As noted above, the esterified interpolymers (A) of this invention contain ester groups. From about 80% to about 100% of the ester groups contain from 8 to about 23 carbon atoms and from 0 to about 20% contain from 2 to 7 carbon atoms. The ester groups containing from 8 to about 23 carbon atoms may be formed by reacting the carboxy-containing interpolymer with an alcohol containing at least 7 carbon atoms. In one embodiment, the alcohol contains from about 7, or about 8 to about 22, or to about 18, or even to about 16 carbon atoms. Examples of useful alcohols include heptanol, octanol, decanol, dodecanol, tridecanol, pentadecanol, octadecanol, etc.

In the embodiment wherein the interpolymer is derived from styrene, maleic anhydride and lower alkyl methacrylic esters, it is preferred that esters derived from the maleic anhydride moiety are substantially free of lower alkyl esters.

The interpolymer may be esterified with alcohols selected from a class of alcohols which includes commercially available mixtures of alcohols. These include oxoalcohols which comprise, for example, a mixture of alcohols having from about 8–22 carbon atoms. Of the various commercial alcohols, another class of alcohols includes the alcohols having from about 8 to 30 aliphatic carbon atoms. The alcohols may comprise, for example, octyl alcohol, decyl alcohol, dodecyl alcohol, tetradecyl alcohol, pentadecyl alcohol, eicosyl alcohol, octadecyl alcohol, etc. Several suitable sources of these alcohol mixtures are the technical grade alcohols sold under the name NEODOL® alcohols (Shell Oil Company, Houston, Tex.) and under the name ALFOL® alcohols (Vista Chemical, Westlake, La.), and fatty alcohols derived from animal and vegetable fats and sold commercially by, for example, Henkel, Condea, and Emory.

The esters may be mixed esters derived from a combination of alcohols including alcohols containing at least 7 carbon atoms (relatively high molecular weight alcohols) and alcohols containing less than 7 carbon atoms (relatively low molecular weight alcohols). Alcohols containing at least 7 carbon atoms are those described hereinabove. Alcohols containing less than 7 carbon atoms generally contain from 1 or about 2, to about 6, or to about 5 carbon atoms. Examples of the low molecular weight alcohols include methanol, ethanol, propanol, butanol, pentanol, hexanol, cyclopentanol, and cyclohexanol. The above list is also meant to include the various isomeric arrangements of these alcohols. For instance, butanol refers to n-butanol, sec-butanol, isobutanol, etc.

Mixed esters of the carboxy-containing interpolymer are most conveniently prepared by first esterifying the carboxy-containing interpolymer with a relatively high molecular weight alcohol and a relatively low molecular weight alcohol to convert from about 80% up to about 99% of the carboxy groups of the interpolymer to ester groups.

When utilizing a combination of a high molecular weight alcohol and a low molecular weight alcohol, the esterification may be carried out, for example, by initially esterifying at least about 50 molar percent or from about 50 to 75 molar percent, frequently up to about 90 molar percent of the carboxy radicals with the high molecular weight alcohol and then subsequently esterifying the partially-esterified carboxy-containing interpolymer with a low molecular weight alcohol and remaining unreacted high molecular weight alcohol, if any, to obtain an esterified carboxy interpolymer having at least 80 molar percent of the ester groups derived from the high molecular weight aliphatic alcohol and up to 20 molar percent of ester groups derived from the low molecular weight aliphatic alcohol. For example, esterification with a combination of high and low molecular weight alcohols may be accomplished, in sequence, by first carrying out the esterification with the high molecular weight alcohol, e.g., up to about 75 molar percent and subsequently esterifying the remaining carboxylic groups with the low molecular weight alcohol, to attain the desired degree of esterification.

Alternatively, the carboxylic groups of the interpolymer may be simultaneously esterified with a mixture of the alcohols to obtain a carboxy-containing interpolymer esterified with a combination of high and low molecular weight aliphatic alcohols.

The following examples illustrate several esterified interpolymers useful for preparing the compositions of the instant invention. Unless otherwise indicated all temperatures are in degrees Celsius, pressures are atmospheric, parts by volume are given in relative amounts as parts by weight in grams to parts by volume in milliliters. The extent of esterification is calculated by determining the total acid number (phenolphthalein indicator) and the strong acid number (bromphenol blue indicator) of the reaction mixture. The total acid number includes contributions from unesterified polymer and catalyst. The strong acid number is the measure of the acid number of the catalyst. The difference between the two acid numbers, the net acid number, is the acid number due to unesterified polymer. Filtrations are conducted using a diatomaceous earth filter aid. Molecular weights of the interpolymers are determined employing the procedure set forth hereinabove employing conditioned columns. Neat acid numbers (e.g., Neat TAN) are determined on diluent-free product. When the product contains diluent, the neat acid number is calculated from the observed acid number, adjusting for diluent.

EXAMPLE A-1

A reactor is charged with 2850 parts of a 21.1% solids in toluene slurry of a maleic anhydride/styrene/methyl methacrylate (1:1:0.05 mole ratio) terpolymer having $\overline{\text{Mn}}$ about 8400 and $\overline{\text{Mw}}$ about 30,000, and 846 parts of Alfol 1218 (a mixture of predominantly straight chain primary alcohols having from 12 to 18 carbon atoms). The materials are heated at 115–120° C. for 3.5 hours while toluene is removed and collected in a Dean-Stark trap (2350 parts by volume removed). A mixture of 244 parts Alfol 810 (a mixture of predominantly straight chain primary alcohols having from 8 to 10 carbon atoms) and 31.4 parts 70% methanesulfonic acid is added to the reaction mixture over 1.5 hours while the temperature is increased to 150° C. The reaction is continued at 150° C. for 14 hours; 52 parts by volume aqueous distillate is collected and a total of 2565 parts by volume toluene is collected. Total acid no=22.4 and strong acid no=3.71. An additional 25 parts Alfol 810 and 100 parts by volume toluene are added and reaction is continued for 14 hours. Toluene, 200 parts by volume, is added dropwise and heating is continued at 150° C. for 14 hours. Total acid no=15, infrared spectrum shows no —OH. The sulfonic acid is neutralized with 18.4 parts 50% aqueous NaOH by mixing at 150° C. for 2 hours. Total acid no=14.6. Viscosity @ 100° C.=2844 centistokes.

EXAMPLE A-2

A reactor is charged with 2485 parts of Alfol 1218 alcohol, 3183 parts of a 24% by weight solids in toluene slurry of a maleic anhydride/styrene/methyl methacrylate (1:1:0.05 mole ratio) terpolymer having $\overline{\text{Mn}}$ about 10,000, 3343 parts of a 25.9% solids in toluene slurry of a maleic anhydride/styrene/methyl methacrylate (1:1:0.05 mole ratio) terpolymer having $\overline{\text{Mn}}$ about 10,000, and 712 parts of Alfol 810 alcohol. The temperature is increased to 66° C. while removing toluene, 91.5 parts methane sulfonic acid are added, then the temperature is ramped to 138° C. over 8.5 hours followed by heating at 138–149° C. for 10 hours, removing distillate; acid number of residue=5.6. The batch is neutralized with a total of 50.7 parts 50% aqueous NaOH, followed by vacuum stripping at about 120° C. The residue is filtered. TAN is about 12.2.

EXAMPLE A-3

A reactor is charged with 1831 parts Alfol 1218 alcohol and 4298 parts of a 28.2% by weight solids in toluene slurry of maleic anhydride/styrene (1:1 molar) copolymer having $\overline{\text{Mn}}$ about 35,000 which is stripped at 104° C., under reduced pressure near end of stripping procedure. A portion (100 parts by volume) distillate is returned to the reactor then 522 parts Alfol 810 alcohol and 64.8 parts methane sulfonic acid are added. The temperature is ramped to 150° C. over 5 hours while removing distillate. A portion of the distillate (180 parts by volume) is returned to the reactor and the reaction is continued for 5 hours at about 150° C. The catalyst is neutralized with a total of 31.8 parts 50% aqueous NaOH then vacuum stripped at about 150° C., the vacuum is released and 1188 parts mineral oil are added under N₂ blanket. The temperature is reduced to 67° C. and the oil solution is filtered. Neat TAN=4.8.

EXAMPLE A-4

The procedure of Example A-3 is repeated employing 4505 parts of a 26.9% by weight solids in toluene slurry of maleic anhydride/styrene (1:1 molar) copolymer having $\overline{\text{Mn}}$ about 35,000, 3456 parts mineral oil, 1746 parts Alfol 1218 alcohols, 498 parts Alfol 810 alcohols and 61.8 parts methane sulfonic acid. The catalyst is neutralized with a total of 29.4 parts 50% aqueous NaOH. Neat TAN=17.9.

EXAMPLE A-5

A reactor is charged with 1583 parts mineral oil, 766 parts Alfol 1218 alcohol and 4626 parts of a 26.2% by weight solids in toluene slurry of maleic anhydride/styrene (1:1 molar) copolymer having $\overline{\text{Mn}}$ about 35,000 which is stripped at 107° C., under reduced pressure near end of stripping procedure. To the residue are added 1189 parts Alfol 810 alcohol and 63.3 parts methane sulfonic acid. The temperature is ramped to 150° C. over 5 hours while removing aqueous distillate and allowing organic distillate to return to reactor. The reaction is continued for 16 hours at about 150° C. Net neutralization number=7.6 (acid). A mixture of 30 parts Alfol 1218 and 70 parts Alfol 810 is prepared and 54 parts of the mixture are added to the reactor. The reaction is continued for 9.5 hours whereupon the catalyst is neutralized with a total of 31 parts 50% aqueous NaOH. The materials are vacuum stripped at about 150° C. The vacuum is released and 1583 parts mineral oil are added under N₂ blanket. The temperature is reduced to 120° C. and the oil solution is filtered. Neat TAN=12.2.

EXAMPLE A-6

A reactor is charged with 1752 parts mineral oil (Mobil 100N) and 1784 parts Alfol 1218 alcohols. The materials are mixed then 4590.9 parts of a 26.4% in toluene slurry of a maleic anhydride/styrene (1:1 molar) copolymer having $\overline{\text{Mn}}$ about 35,000 are added followed by heating to 103° C. and stripping at 103° C.–110° C. for 1 hour. The pressure is reduced to 249 mm Hg and additional distillate is removed. To the residue are added 508 parts Alfol 810 alcohols and 63 parts methane sulfonic acid followed by heating to 143° C. over 5 hours while collecting additional distillate. At this point strong acid number=9.55 and weak acid number=3.53. Heating is continued for 3 hours at 148° C. Strong acid number=7.67 and weak acid number=3.47. The strong acid is neutralized with 66.6 parts 50% aqueous NaOH at 145° C. for 1 hour, the materials are stripped to 141° C. at 40 mm Hg, 1752 parts additional mineral oil are added and the solution is filtered. Neat TAN=7.2.

EXAMPLE A-7

Following essentially the procedure of Example A-1 an ester is prepared with 3183 parts of a 24% by weight solids in toluene slurry of a maleic anhydride/styrene/methyl methacrylate (1:1:0.05 mole ratio) terpolymer having $\overline{\text{Mn}}$ about 11,000, 3343 parts of a 25.9% solids in toluene slurry of a maleic anhydride/styrene/methyl methacrylate (1:1:0.05 mole ratio) terpolymer having $\overline{\text{Mn}}$ about 11,000, 1450 parts of Alfol 1218 alcohols, 1452 parts Alfol 810 alcohols and 91.5 parts methane sulfonic acid. The product is filtered. Neat TAN=12.3.

EXAMPLE A-8

A reactor is charged with 3927 parts of a 18% in toluene slurry of a maleic anhydride/styrene (1:1 molar) copolymer having $\overline{\text{Mn}}$ about 65,000 and 976 parts of Alfol 1218 alcohols. After the mixture is heated to 100° C., 171 parts Alfol 810 alcohols and 13.6 parts methanesulfonic acid are added over 0.1 hour, heated at 100° C.–110° C. for 1 hour, then is heated to 150° C. After heating for 4 hours while removing distillate, net neutralization number=6.29. To the reaction are charged 93 parts n-butanol and 3.9 parts methanesulfonic acid and the reaction is continued for 4 hours whereupon net neutralization no=2.24. An additional 93 parts n-butanol and 3.9 parts methanesulfonic acid are added and the reaction was continued for 2 more hours at which time no further distillate forms. The temperature is reduced to 120° C. and 8.4 parts hindered phenol are added. The temperature is increased to 150° C. and is maintained for 6 hours while an additional amount of distillate is removed. Neat neutralization numbers are 3.42 (total) and 1.24 (strong acid).

EXAMPLE A-9

A reactor is charged with 757.5 parts of a maleic anhydride/styrene (1:1 molar) copolymer having $\overline{M}n$ about 65,000, 3119 parts mineral oil (Shell HVI-100), 332 parts toluene and 1042 parts Alfol 1218 alcohols. The materials are stirred and heated to 100° C. whereupon a solution of 20.8 parts methanesulfonic acid and 184 parts Alfol 810 alcohols are charged, the materials are heated to 150° C. and are refluxed for 4.5 hours. To the reaction are added, over 0.2 hour, 100 parts n-butanol and the materials are refluxed for 1.5 hours then an additional 100 parts n-butanol are charged and the materials are refluxed for 16 hours. Neutralization numbers are 4.9 (total) and 0.9 (strong acid). The strong acid is neutralized with 50% aqueous NaOH, 9.75 parts hindered phenol are added and the materials are stripped to 150° C. at 80 mm Hg pressure. A second portion of 9.75 parts hindered phenol and 1100 parts mineral oil (Shell HVI-100) are added and the solution is filtered. TAN=2.2.

(B) Hydrocarbyl Group Substituted Carboxylic Acid or Functional Derivative Thereof The compositions of this invention are obtained by reacting a mixture of the esterified interpolymer (A) and (B) a hydrocarbyl group substituted carboxylic acid or functional derivative thereof with (C) an amine having an average of more than 1, preferably at least 1.1, often at least about 1.5 condensable N—H groups, or with the preformed reaction product of (B) and (C), wherein said preformed reaction product contains at least one condensable N—H group. A functional derivative is one which can react with (C) to generate N-containing derivatives analogous to the products prepared from the corresponding carboxylic acid. Examples of functional derivatives include esters, especially lower alkyl esters, anhydrides, acyl halides and the like.

The hydrocarbyl group comprises from about 10 to about 400 carbon atoms, more often from about 30 to about 200 carbon atoms, often to about 100 carbon atoms, and frequently from about 30, often from about 50, to about 100 carbon atoms. The hydrocarbyl group generally has number average molecular weight ($\overline{M}_n$) ranging from about 100, often from about 500, to about 6000, often to about 4000, frequently from about 500 to about 3000, more frequently from about 900 to about 2000.

The carboxylic acids or functional derivatives thereof are usually derived by the reaction of a carboxylic acid containing compound with a polyalkene or halogenated derivative thereof or a suitable olefin. Carboxylic acid containing compounds useful as reactants to form component (B) include α,β-unsaturated materials such as acrylic and methacrylic acids, maleic acid, fumaric acid, itaconic acid, crotonic acid, esters, particularly lower alkyl esters, and anhydrides of these acids, compounds of the formula $$R^3C(O)(R^4)_nC(O)OR^5 \tag{IV}$$

and reactive sources thereof such as compounds of the formula

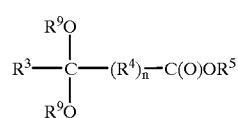

(V)

wherein each of $R^3$, $R^5$ and each $R^9$ is independently H or a hydrocarbyl group, $R^4$ is a divalent hydrocarbylene group, preferably lower alkylene, more preferably methylene, ethylene or propylene, and n is 0 or 1, preferably, 0. Examples of (V) include the acetals and hemiacetals, esters, and others. Glyoxylic acid, its hydrate and glyoxylic acid methyl ester, methyl hemiacetal are particularly preferred reactants of this type.

Products derived from carboxylic compounds of Formula (IV) and Formula (V) include α-hydroxy substituted carboxylic acids and esters thereof and α-hydroxy lactones.

Useful hydrocarbyl substituted carboxylic acids or functional derivatives thereof may be prepared using any one of the foregoing carboxylic acid compounds, or with two or more thereof, simultaneously or sequentially, preferably sequentially, in any order.

The polyalkenes from which the carboxylic acids (B) are derived are homopolymers and interpolymers of polymerizable olefin monomers of 2 to about 16 carbon atoms; usually 2 to about 6 carbon atoms. The interpolymers are those in which two or more olefin monomers are interpolymerized according to well-known conventional procedures to form polyalkenes having units within their structure derived from each of said two or more olefin monomers. Thus, "interpolymer(s)" as used herein is inclusive of copolymers, terpolymers, tetrapolymers, and the like. As will be apparent to those of ordinary skill in the art, the polyalkenes from which the substituent groups are derived are often conventionally referred to as "polyolefin(s)".

Especially preferred polyalkenes are polypropylene and polybutylene, especially, polyisobutylene, containing from about 20 to about 300 carbon atoms, often from about 30, frequently from about 50 to about 100 carbon atoms.

The olefin monomers from which the polyalkenes are derived are polymerizable olefin monomers characterized by the presence of one or more ethylenically unsaturated groups (i.e., >C=C<); that is, they are monolefinic monomers such as ethylene, propylene, butene-1, isobutene, and octene-1 or polyolefinic monomers (usually diolefinic monomers) such as butadiene-1,3 and isoprene.

These olefin monomers are usually polymerizable terminal olefins; that is, olefins characterized by the presence in their structure of the group >C=CH2. However, polymerizable internal olefin monomers (sometimes referred to in the literature as medial olefins) characterized by the presence within their structure of the group

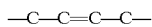

can also be used to form the polyalkenes. When internal olefin monomers are employed, they normally will be employed with terminal olefins to produce polyalkenes which are interpolymers. For purposes of this invention, when a particular polymerized olefin monomer can be classified as both a terminal olefin and an internal olefin, it will be deemed to be a terminal olefin. Thus, 1,3-pentadiene (i.e., piperylene) is deemed to be a terminal olefin.

The hydrocarbyl substituent of the carboxylic acid or functional derivative thereof may be derived from a terpolymer, a copolymer derived from at least two olefins, usually alpha olefins, and a non-conjugated polyene, preferably a diene or triene, usually a diene. The terpolymers are generally lower molecular weight terpolymers such as those having $\overline{M}_n$ ranging from about 1000 to about 6,000, more often from about 2500 to about 4,000.

One of the olefins is usually ethylene and the other is an olefin having from 3 to about 28 carbon atoms, often 3 to about 8 carbon atoms, more often 3 or 4 carbon atoms. Most often one olefin is ethylene and the other is propylene.

The third component utilized in preparing the terpolymer is at least one non-conjugated polyene, usually a diene. Examples include aliphatic dienes such as 1,4- and 1,5-hexadienes, branched dienes such as 3- and 4-methyl 1,4-hexadienes, bicyclic dienes such as exo- and endo-dicyclopentadiene, exo- and endo-alkenyl norbornenes, alkyl alkenyl norbornenes, alkylidene norbornenes such as 5-methylene-2-norbornene, alkyl norbornadienes such as methyl norbornadiene, cyclodienes, etc. In a preferred embodiment, the diene is a dicyclopentadiene or alkylidene norbornene.

The ethylene content of ethylene-alpha olefin-non-conjugated polyene terpolymers generally ranges from about 25% to about 85% by weight, preferably from about 30% to about 75% and more preferably from about 40% to about 70% by weight. The polyene content typically is below about 25%, preferably between about 2% to about 20% and more often from about 0.5% or about 1% to about 15% by weight.

The terpolymers are prepared by methods well known to those of skill in the art and are commercially available, for example those marketed by Uniroyal Chemical Co., Inc., Middlebury, Conn., USA, under the tradename TRILENE®. Specific examples include Trilene 67 and 68, terpolymers of ethylene, propylene and ethylidene norbornene (ENB), and Trilene 55 and 65, terpolymers of ethylene, propylene and dicyclopentadiene. Some typical characteristics of Trilene 67 and 68 are iodine number 19 and 6, ethylene/propylene/(ENB) (wt) 46/54/9.5 and 45/55/3, viscosity average molecular weight 7500 and 8000, and average C=C per molecule 5.6 and 1.9, respectively.

Examples of procedures for determining the molecular weights of materials used to generate the hydrocarbyl substituent of (B) are gel permeation chromatography (GPC) (also known as size-exclusion chromatography) and vapor phase osmometry (VPO). These and other procedures are described in numerous publications including:

P. J. Flory, "Principles of Polymer Chemistry", Cornell University Press (1953), Chapter VII, pp 266–316, "Macromolecules, an Introduction to Polymer Science", F. A. Bovey and F. H. Winslow, Editors, Academic Press (1979), pp 296–312, and W. W. Yau, J. J. Kirkland and D. D. Bly, "Modern Size Exclusion Liquid Chromatography", John Wiley and Sons, New York, 1979.

A measurement which is complementary to a polymer's molecular weight is the melt index (ASTM D-1238). Polymers of high melt index generally have low molecular weight, and vice versa. The grafted polymers of the present invention preferably have a melt index of up to 20 dg/min, more preferably 0.1 to 10 dg/min.

These publications are hereby incorporated by reference for relevant disclosures contained therein relating to the determination of molecular weight.

A number of methods are available for reacting the α,β-unsaturated carboxylic compounds with the polyalkene or chlorinated derivative thereof or with a suitable olefin. Illustrative methods include the 'ene' reaction wherein the carboxylic compound is reacted, with heating, with the unsaturated reagent, by blowing with halogen, usually chlorine, or by combinations of these methods. The (B) reactant may be prepared by any of these techniques or by others known in the art.

When the carboxylic compound is a compound of formula (IV) or is a functional derivative thereof, it is generally required that is reacted with an olefinic reactant, preferably in the presence of an acidic catalyst.

Preferred materials useful as component (B) include polyolefin substituted carboxylic, preferably succinic, acids and anhydrides. Especially preferred are the succinic anhydrides. In one embodiment, component (B) is an aliphatic substituted succinic anhydride or acid containing from about 10 to about 400 carbon atoms in the aliphatic substituent, preferably from about 30 to about 400 carbon atoms, and often from about 50 to about 200 carbon atoms, frequently to about 100 carbon atoms.

Hydrocarbyl group substituted carboxylic acid or functional derivatives thereof useful as (B) are characterized by the presence of an average of from about 0.5, more often from about 1, frequently from about 2, up to about 6, often to about 4 carboxylic groups per mole of polyolefin or mole, based on $\overline{M}_n$, of polymer. In one embodiment, when the hydrocarbyl group is derived from polyolefin, there are an average of from 1 to about 4 carboxy groups per mole of polyolefin.

Patents describing hydrocarbyl substituted, and especially aliphatic carboxylic acids and functional derivatives thereof useful in the preparation of the compositions of this invention, and methods for preparing the carboxylic acids and functional derivatives thereof include, among numerous others, U.S. Pat. No. 3,215,707 (Rense); U.S. Pat. No. 3,219,666 (Norman et al), U.S. Pat. No. 3,231,587 (Rense); U.S. Pat. No. 3,912,764 (Palmer); U.S. Pat. No. 4,110,349 (Cohen); and U.S. Pat. No. 4,234,435 (Meinhardt et al); U.S. Pat. No. 5,696,060 ((Baker et al): U.S. Pat. No. 5,696,067 (Adams et al); and U.K. 1,440,219. These patents are hereby incorporated by reference for their disclosure of carboxylic acids and functional derivatives thereof useful as component (B) of this invention.

Carboxylic acids and functional derivatives thereof and methods for preparing them are well known to those skilled in the art and details regarding such materials, including preparation thereof are given in the aforementioned patents. Non-limiting examples of compounds useful as component (B) include those illustrated in the following examples: Unless otherwise indicated all temperatures are in degrees Celsius, pressures are atmospheric, the relationship of parts by volume to parts by weight is as milliliters to grams, and filtrations are conducted using a diatomaceous earth filter aid.

EXAMPLE B-1

A mixture of 6400 parts (4 moles) of a polybutene comprising predominantly isobutene units and having a molecular weight of about 1600 and 408 parts (4.16 moles) of maleic anhydride is heated at 225–240° C. for 4 hours. It is then cooled to 170° C. and an additional 102 parts (1.04 moles) of maleic anhydride is added, followed by 70 parts (0.99 mole) of chlorine; the latter is added over 3 hours at 170–215° C. The mixture is heated for an additional 3 hours at 215° C., vacuum stripped at 220° C. and filtered. The product is the desired polybutenyl-substituted succinic anhydride having a saponification number of 61.8.

EXAMPLE B-2

A monocarboxylic acid is prepared by chlorinating a polyisobutene having a molecular weight of 750 to a product having a chlorine content of 3.6% by weight, converting the product to the corresponding nitrile by reaction with an equivalent amount of potassium cyanide in the presence of a catalytic amount of cuprous cyanide and hydrolyzing the resulting nitrile by treatment with 50% excess of dilute aqueous sulfuric acid at reflux temperature.

EXAMPLE B-3

A high molecular weight mono-carboxylic acid is prepared by telomerizing ethylene with carbon tetrachloride to a telomer having an average of 35 ethylene radicals per molecule and hydrolyzing the telomer to the corresponding acid in according with the procedure described in British Patent No. 581,899.

EXAMPLE B-4

A polybutenyl succinic anhydride is prepared by the reaction of a chlorinated polybutylene with maleic anhydride at 200° C. The polybutenyl radical has an average molecular weight of 805 and contains primarily isobutene units. The resulting alkenyl succinic anhydride is found to have an acid number of 113 (corresponding to an equivalent weight of 500).

EXAMPLE B-5

A lactone acid is prepared by reacting 2 equivalents of a polyolefin ($\overline{M}n$ about 900) substituted succinic anhydride with 1.02 equivalents of water at a temperature of about 90° C. in the presence of a catalytic amount of concentrated sulfuric acid. Following completion of the reaction, the sulfuric acid catalyst is neutralized with sodium carbonate and the reaction mixture is filtered.

EXAMPLE B-6

An ester acid is prepared by reacting 2 equivalents of an alkyl substituted succinic anhydride having an average of about 35 carbon atoms in the alkyl group with 1 mole of ethanol.

EXAMPLE B-7

A reactor is charged with 1000 parts of polybutene having a molecular weight determined by vapor phase osmometry of about 950 and which consists primarily of isobutene units, followed by the addition of 108 parts of maleic anhydride. The mixture is heated to 110° C. followed by the sub-surface addition of 100 parts $Cl_2$ over 6.5 hours at a temperature ranging from 110 to 188° C. The exothermic reaction is controlled as not to exceed 188° C. The batch is blown with nitrogen then stored.

EXAMPLE B-8

The procedure of Example B-7 is repeated employing 1000 parts of polybutene having a molecular weight determined by vapor phase osmometry of about 1650 and consisting primarily of isobutene units and 106 parts maleic anhydride. $Cl_2$ is added beginning at 130° C. and added at a nearly continuous rate such that the maximum temperature of 188° C. is reached near the end of chlorination. The residue is blown with nitrogen and collected.

EXAMPLE B-9

A reactor is charged with 3000 parts of a polyisobutene having a number average molecular weight of about 1000 and which contains about 80 mole % terminal vinylidene groups and 6 parts 70% aqueous methanesulfonic acid. The materials are heated to 160° C. under $N_2$ followed by addition of 577.2 parts 50% aqueous glyoxylic acid over 4 hours while maintaining 155–160° C. Water is removed and is collected in a Dean-Stark trap. The reaction is held at 160° C. for 5 hours, cooled to 140° C. and filtered. The filtrate has total acid no. (ASTM Procedure D-974)=34.7 and saponification no. (ASTM Procedure D-74)=53.2. $\overline{M}_n$ (Gel permeation chromatography (GPC))=1476 and $\overline{M}_w$ (GPC)=3067; unreacted polyisobutene (Thin layer chromatography-Flame ionization detector (TLC-FID))=8.6%.

EXAMPLE B-10

A polyisobutylene chloride is obtained using 1 mole of polyisobutylene ($\overline{M}_n$ 2136) and 0.91 mole chlorine in hexane at 70–75° C. with removal of hexane following chlorination. This chloride (500 parts, 0.2205 mole) and 32 parts maleic anhydride (0.3265 mole) are heated at 150° C.–190° C. under $N_2$ purge for 1 hour and held at 190° C. for 7 hours. After cooling to about 150° C., 15.5 parts maleic anhydride are charged, $N_2$ is stopped and 12.5 parts (0.175 mole) $Cl_2$ are blown into the mixture over 2 hours. $N_2$ is resumed and the temperature is ramped from 150° C. to 190° C. and is held for 7 hours. The mixture is then heated to 220° C. for 4 hours to total acid number of 77. The product has degree of succination about 1.5 and about 1600 parts per million residual Cl.

EXAMPLE B-11

An aliphatic group substituted succinic anhydride is prepared by the direct alkylation reaction (thermal reaction) of a polyisobutylene ($\overline{M}_n$=1000) with maleic anhydride. The resulting product has total acid number of about 76, about 100 parts per million Cl and contains no more than 0.4% by weight unreacted maleic anhydride.

EXAMPLE B-12

A reactor charged with 592 parts 50% aqueous glyoxylic acid is heated to 70° C., a vacuum is applied and the materials are stripped to 80° C. at 25 mm Hg., collecting 231 parts water. The reactor is cooled to room temperature whereupon 200 parts of the polyisobutene of Example 2, Part A and 3 parts 70% aqueous methane sulfonic acid are added followed by heating for a total of 8 hours at 160° C. while collecting 207 parts aqueous distillate. The materials are diluted with 717.3 parts mineral oil, mixed and filtered at 130° C. The filtrate has saponification no.=65.9.

EXAMPLE B-13

A reactor is charged with 4830 parts of the reaction product derived by heating 1 mole polyisobutylene (Glissopal 2300, BASF) having $\overline{M}_n$ about 2300 and about 90% terminal vinylidene groups and 0.9 moles maleic anhydride, 422 parts glyoxylic acid methyl ester methyl hemiacetal, 15 parts 70% methane sulfonic acid, 0.1 part silicone antifoam agent and 1000 parts mineral oil. The materials are heated to 135° C. over 0.5 hour, under $N_2$ and the temperature is maintained for 4 hours followed by stripping to 25 mm Hg for 1 hour. An additional 2426 parts mineral oil are added, the materials are mixed, then filtered.

The Amine

The amine used to prepare the compositions of the instant invention contains an average of more than 1, preferably at least 1.1 condensable N—H groups, often an average of at least 1.5, preferably an average of at least 2 condensable N—H groups, up to about 10, often up to about 6 condensable N—H groups. In one embodiment, the amine (C) is reacted with a mixture of (B) the hydrocarbyl substituted carboxylic acid or functional derivative thereof and the esterified interpolymer (A). In another embodiment, the esterified interpolymer (A) is reacted with the preformed reaction product of (B) and (C) wherein said preformed reaction product has at least one condensable N—H group.

Suitable amine reactants, as defined herein, include hydrazines, or polyamines. Monoamines may be used in admixture with polyamines but not as the sole amine reactant. The amine reactant must contain an average of more than 1 condensable N—H group. The amines may be aliphatic, cycloaliphatic, aromatic and heterocyclic.

The monoamines generally contain from 1 to about 24 carbon atoms, preferably 1 to about 12, and more preferably 1 to about 6. Examples of monoamines useful in the present invention include primary amines, for example methylamine, ethylamine, propylamine, butylamine, octylamine, and dodecylamine. Examples of secondary amines include dimethylamine, diethylamine, dipropylamine, dibutylamine, methylbutylamine, ethylhexylamine, etc. Tertiary monoamines do not possess an N—H group.

In another embodiment, the monoamine may be a hydroxyamine. Typically, the hydroxyamines are primary or secondary alkanolamines or mixtures thereof. As stated above, tertiary monoamines do not possess an N—H group; however, tertiary alkanol monoamines sometimes can react to form a tertiary amino group containing ester. Alkanol amines that possess an N—H group can be represented, for example, by the formulae:

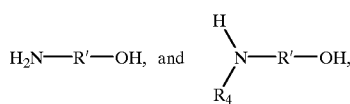

wherein each $R_4$ is independently a hydrocarbyl group of one to about 22 carbon atoms or hydroxyhydrocarbyl group of two to about 22 carbon atoms, preferably one to about four, and R' is a divalent hydrocarbyl group of about two to about 18 carbon atoms, preferably two to about four. The group —R'—OH in such formulae represents the hydroxyhydrocarbyl group. R' can be an acyclic, alicyclic or aromatic group. Typically, R' is an acyclic straight or branched alkylene group such as an ethylene, 1,2-propylene, 1,2-butylene, 1,2-octadecylene, etc. group. When two $R^4$ groups are present in the same molecule they can be joined by a direct carbon-to-carbon bond or through a heteroatom (e.g., oxygen, nitrogen or sulfur) to form a 5-, 6-, 7- or 8-membered ring structure. Typically, however, each $R^4$ is independently a methyl, ethyl, propyl, butyl, pentyl or hexyl group.

Examples of alkanolamines include monoethanolamine, ethylaminoethanol, butylaminoethanol, etc.

The hydroxyamines can also be ether N-(hydroxyhydrocarbyl) amines. These are hydroxy poly (hydrocarbyloxy) analogs of the above-described hydroxy amines (these analogs also include hydroxyl-substituted oxyalkylene analogs). Such N-(hydroxy-hydrocarbyl) amines can be conveniently prepared, for example, by reaction of epoxides with aforedescribed amines and can be represented by the formulae:

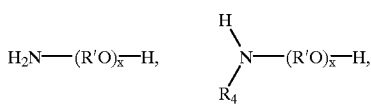

wherein x is a number from about 2 to about 15 and $R_4$ and R' are as described above. $R_4$ may also be a hydroxypoly (hydrocarbyloxy) group.

Other useful amines include ether amines of the general formula $$R_6OR^1NHR_7$$

wherein $R_6$ is a hydrocarbyl group, preferably an aliphatic group, more preferably an alkyl group, containing from 1 to about 24 carbon atoms, $R^1$ is a divalent hydrocarbyl group, preferably an alkylene group, containing from two to about 18 carbon atoms, more preferably two to about 4 carbon atoms and $R_7$ is H or hydrocarbyl, preferably H or aliphatic, more preferably H or alkyl, more preferably H. When $R_7$ is not H, then it preferably is alkyl containing from one to about 24 carbon atoms. Especially preferred ether amines are those available under the name SURFAM produced and marketed by Sea Land Chemical Co., Westlake, Ohio.

The amine will comprise a polyamine. The polyamine may be aliphatic, cycloaliphatic, heterocyclic or aromatic. Examples of polyamines include alkylene polyamines, hydroxy containing polyamines, polyoxyalkylene polyamines, arylpolyamines, and heterocyclic polyamines.

Alkylene polyamines are represented by the formula

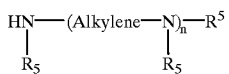

wherein n has an average value between about 1 and about 10, preferably about 2 to about 7, more preferably about 2 to about 5, and the "Alkylene" group has from 1 to about 10 carbon atoms, preferably about 2 to about 6, more preferably about 2 to about 4. Each $R_5$ is independently hydrogen, an aliphatic group, an amino- or hydroxy-substituted aliphatic group of up to about 30 carbon atoms and the like. Preferably $R_5$ is H or lower alkyl, most preferably, H.

Alkylene polyamines include methylene polyamines, ethylene polyamines, butylene polyamines, propylene polyamines, pentylene polyamines, etc. Higher homologs and related heterocyclic amines such as piperazines and N-amino alkyl-substituted piperazines are also included. Specific examples of such polyamines are ethylenediamine, diethylenetriamine, triethylenetetramine, tris-(2-aminoethyl)amine, propylenediamine, trimethylenediamine, tripropylenetetramine, tetraethylenepentamine, hexaethyleneheptamine, pentaethylenehexamine, dimethylaminopropylamine, etc.

Higher homologs obtained by condensing two or more of the above-noted alkylene amines are similarly useful as are mixtures of two or more of the aforedescribed polyamines.

Ethylene polyamines, such as some of those mentioned above, are preferred. They are described in detail under the heading Ethylene Amines in Kirk Othmer's "Encyclopedia of Chemical Technology", 2d Edition, Vol. 7, pages 22–37, Interscience Publishers, New York (1965). Such polyamines are most conveniently prepared by the reaction of ethylene dichloride with ammonia or by reaction of an ethylene imine with a ring opening reagent such as water, ammonia, etc. These reactions result in the production of a complex mixture of polyalkylene polyamines including cyclic condensation products such as the aforedescribed piperazines. Ethylene polyamine mixtures are useful.

Other useful types of polyamine mixtures are those resulting from stripping of the above-described polyamine mixtures to leave as residue what is often termed "polyamine bottoms". In general, alkylene polyamine bottoms can be characterized as having less than two, usually less than 1% (by weight) material boiling below about 200° C. A typical sample of such ethylene polyamine bottoms obtained from the Dow Chemical Company of Freeport, Tex., designated "E-100" has a specific gravity at 15.6° C. of 1.0168, a percent nitrogen by weight of 33.15 and a viscosity at 40° C. of 121 centistokes. Gas chromatography analysis of such a sample contains about 0.93% "Light Ends" (most probably diethylenetriamine), 0.72% triethylenetetramine, 21.74% tetraethylenepentamine and 76.61% pentaethylene hexamine and higher (by weight). Another example of polyamine bottoms is one having an equivalent weight of 40.5 based on % N, sold as HPA-X by Union Carbide. These alkylene polyamine bottoms include cyclic condensation products such as piperazine and higher analogs of diethylenetriamine, triethylenetetramine and the like.

Another useful polyamine is a condensation product obtained by reaction of at least one hydroxy compound with at least one polyamine reactant containing at least one primary or secondary amino group. The hydroxy compounds are preferably polyhydric alcohols and amines, especially polyhydric amines. Polyhydric amines include any of the above-described monoamines reacted with an alkylene oxide (e.g., ethylene oxide, propylene oxide, butylene oxide, etc.) having two to about 20 carbon atoms, preferably two to about four. Examples of polyhydric amines include tri-(hydroxypropyl)amine, tris-(hydroxymethyl)amino methane, 2-amino-2-methyl-1,3-propanediol, N,N,N',N'-tetrakis(2-hydroxypropyl) ethylenediamine, and N,N,N',N'-tetrakis(2-hydroxyethyl) ethylenediamine.

Polyamine reactants, which react with the polyhydric alcohol or amine to form the condensation products or condensed amines, are described above. Preferred polyamine reactants include triethylenetetramine (TETA), tetraethylenepentamine (TEPA), pentaethylenehexamine (PEHA), and mixtures of polyamines such as the above-described "amine bottoms".

The condensation reaction of the polyamine reactant with the hydroxy compound is conducted at an elevated temperature, usually about 60° C. to about 265° C. in the presence of an acid catalyst.

The amine condensates and methods of making the same are described in Steckel (U.S. Pat. No. 5,053,152) which is incorporated by reference for its disclosure to the condensates and methods of making.

In another embodiment, the polyamines are hydroxy-containing polyamines. Hydroxy-containing polyamine analogs of hydroxy monoamines, particularly alkoxylated alkylenepolyamines can also be used. Such polyamines can be made by reacting the above-described alkylene amines with one or more of the above-described alkylene oxides. Similar alkylene oxide-alkanolamine reaction products can also be used such as the products made by reacting the afore-described primary, secondary or tertiary alkanolamines with ethylene, propylene or higher epoxides in a 1.1 to 1.2 molar ratio. Reactant ratios and temperatures for carrying out such reactions are known to those skilled in the art.

Specific examples of alkoxylated alkylenepolyamines include N-(2-hydroxyethyl) ethylenediamine, N,N-di-(2-hydroxyethyl)-ethylenediamine, 1-(2-hydroxyethyl) piperazine, mono-(hydroxypropyl)-substituted tetraethylenepentamine, N-(3-hydroxybutyl)-tetramethylene diamine, etc. Higher homologs obtained by condensation of the above illustrated hydroxy-containing polyamines through amino groups or through hydroxy groups are likewise useful. Condensation through amino groups results in a higher amine accompanied by removal of ammonia while condensation through the hydroxy groups results in products containing ether linkages accompanied by removal of water. Mixtures of two or more of any of the aforesaid polyamines are also useful.

Suitable amines also include polyoxyalkylene polyamines, e.g., polyoxyalkylene diamines and polyoxyalkylene triamines, having average molecular weights ranging from about 200 to 4000 and preferably from about 400 to 2000. Illustrative examples of these polyoxyalkylene polyamines may be characterized by the formulae: $NH_2$-Alkylene (O-Alkylene)$_m NH_2$, wherein m has a value of about 3 to 70 and preferably about 10 to 35; and R(Alkylene (O-Alkylene)$_n NH_2$)$_{3-6}$, wherein n is from about 1 to 40 with the proviso that the sum of all of the n values is from about 3 to about 70 and generally from about 6 to about 35 and R is a polyvalent saturated hydrocarbon group of up to 10 carbon atoms having a valence of 3 to 6. The alkylene groups may be straight or branched chains and contain from 1 to 7 carbon atoms and usually from 1 to 4 carbon atoms. The various alkylene groups present may be the same or different.

The preferred polyoxyalkylene polyamines include the polyoxyethylene and polyoxypropylene diamines and the polyoxypropylene triamines having average molecular weights ranging from about 200 to 4000 or from about 400 to about 2000. The polyoxyalkylene polyamines are commercially available an may be obtained, for example, from the Texaco Company, Inc. under the trade names "Jeffamines D-230, D-400, D-1000, D-2000, T-403, etc.".

U.S. Pat. Nos. 3,804,763 and 3,948,800 are expressly incorporated herein by reference for their disclosure of such polyoxyalkylene polyamines and process for acylating them with carboxylic acid acylating agents which processes can be applied to their reaction with the carboxylic compositions of the present invention.

In another embodiment, the polyamine may be a heterocyclic polyamine. The heterocyclic polyamines include aziridines, azetidines, azolidines, tetra- and dihydropyridines, pyrroles, indoles, piperidines, imidazoles, di- and tetrahydroimidazoles, piperazines, isoindoles, purines, N-aminoalkylmorpholines, N-aminoalkyl-thiomorpholines, N-aminoalkylpiperazines, N,N'-bis-aminoalkyl piperazines, azepines, azocines, azonines, azecines and tetra-, di- and perhydro derivatives of each of the above and mixtures of two or more of these heterocyclic amines. Preferred heterocyclic amines are the saturated 5- and 6-membered heterocyclic amiries containing only nitrogen, or nitrogen with oxygen and/or sulfur in the hetero ring, especially the piperidines, piperazines, thiomorpholines, morpholines, pyrrolidines, and the like. Piperidine, aminoalkyl substituted piperidines, piperazine, aminoalkyl substituted piperazines, for example, aminoethylpiperazine, morpholine, aminoalkyl substituted morpholines, pyrrolidine, and aminoalkyl-substituted pyrrolidines, are especially preferred. Usually the aminoalkyl groups are substituted on a nitrogen atom forming part of the hetero ring. Specific examples of such heterocyclic amines include N-aminopropylmorpholine, N-aminoethylpiperazine, and N,N'-diaminoethylpiperazine. Hydroxy alkyl substituted heterocyclic polyamines are also useful. Examples include N-hydroxyethylpiperazine and the like.

In another embodiment, the amine is a polyalkene-substituted amine. These polyalkene-substituted amines are well known to those skilled in the art. They are disclosed in U.S. Pat. Nos. 3,275,554; 3,438,757; 3,454,555; 3,565,804; 3,755,433; and 3,822,289. These patents are hereby incorporated by reference for their disclosure of polyalkene-substituted amines and methods of making the same.

Typically, polyalkene-substituted amines are prepared by reacting halogenated-, preferably chlorinated-, olefins and olefin polymers (polyalkenes) with amines (mono- or polyamines). The amines may be any of the amines described above. Examples of these compounds include poly(propylene)amine; N,N-dimethyl-N-poly (ethylene/propylene)amine, (50:50 mole ratio of monomers); polybutene amine; N,N-di(hydroxyethyl)-N-polybutene amine; N-(2-hydroxypropyl)-N-polybutene amine; N-polybutene-aniline; N-polybutenemorpholine; N-poly(butene) ethylene-diamine; N-poly(propylene)trimethylenediamine; N-poly (butene)diethylene-triamine; N',N'-poly(butene) tetraethylenepentamine; N,N-dimethyl-N'-poly(propylene)-1,3-propylene-diamine and the like.

The polyalkene substituted amine is characterized as containing from at least about 8 carbon atoms, preferably at least about 30, more preferably at least about 35 up to about 300 carbon atoms, preferably 200, more preferably 100. In one embodiment, the polyalkene substituted amine is characterized by $\overline{M}n$ (number average molecular weight) value of at least about 500. Generally, the polyalkene substituted amine is characterized by an n value of about 500 to about 5000, preferably about 800 to about 2500. In another embodiment n varies between about 500 to about 1200 or 1300.

As noted hereinabove, ammonia and hydrazines having an average of at least 1.1 condensable N—H group are also useful. Preferably there are at least two hydrogens bonded directly to hydrazine nitrogen and, more preferably, both hydrogens are on the same nitrogen. Substituents which may be present on the hydrazine include alkyl, alkenyl, aryl, aralkyl, alkaryl, and the like. Usually, the substituents are alkyl, especially lower alkyl, phenyl, and substituted phenyl such as lower alkoxy-substituted phenyl or lower alkyl-substituted phenyl. Specific examples of substituted hydrazines are methylhydrazine, NN-dimethyl-hydrazine, N,N'-dimethylhydrazine, phenylhydrazine, N-phenyl-N'-ethylhydrazine, N-phenyl-N'-cyclohexylhydrazine, and the like.

The amine (C) is typically used in amounts ranging from about 0.7 equivalents up to about 2 moles per equivalent of carboxylic acid or functional derivative thereof. Preferably, at least about 1 equivalent, often at least about 1.2 equivalents, up to about 1.5 moles, often up to about 1.5 equivalents, of amine are used per equivalent of carboxylic acid or functional derivative thereof.

A mole of any of (C) is its formula weight, for example, 17.03 for ammonia, 60.10 for ethylenediamine, and 189.31 for tetraethylenepentamine. The equivalent weights of these are 17.03, 30.05 and 37.86, respectively, each determined by dividing the formula weight by the number of nitrogen atoms having at least one H bonded thereto. Thus the equivalent weight of (C) is its formula weight divided by the number of nitrogen atoms per molecule having at least one H atom bonded thereto.

An equivalent of carboxylic acid is equal to one mole of functional groups that will react with the amine. For example, a monocarboxylic acid such as acetic acid provides one equivalent of carboxy group functionality per mole, while succinic anhydride provides two equivalents per mole. For more complex carboxylic compositions, the number of equivalents can be determined by titration with base using means well known in the art.

As noted, the esterified interpolymer (A) may be reacted with the preformed reaction product of (B) and (C). Products obtained from the reaction of acylating agents and amines are well known in the art and are illustrated in numerous U.S. Patents including, for example U.S. Pat. No. 3,172,892, U.S. Pat. No. 4,234,435, U.S. Pat. No. 5,696,067 and many others. The following illustrate several types of preformed reaction products of (B) and (C).

EXAMPLE P-1

About 1330 parts (11.71 equivalents) polyisobutylene acylating agent prepared as in example B-10 is mixed with 1383 parts 100 neutral mineral oil and heated to 99° C. To this is charged 100 parts (2.4 equivalents) of polyethylene-amine bottoms (HPA-X, Union Carbide) followed by heating to about 100° over 2 hours. The temperature is then increased to 149° C. over 3 hours under $N_2$ purge and is maintained at 149° C. for 1 hour while removing distillate. The materials are filtered yielding a product having total base number (TBN) of about 27.5 and TAN 1.3.

EXAMPLE P-2

A reactor is charged with 350 parts of the product of Example B-9, 17.2 parts diethylene triamine and 267.5 parts mineral oil diluent, is heated under $N_2$ to 160° C. and held at 160° C. for 5 hours then filtered 145° C. Filtrate contains 1.02% N.

EXAMPLE P-3

A reactor is charged with 350 parts of the product of Example B-12, 26.6 parts of polyamine bottoms having an equivalent weight of 40.5 per N (HPA-X, Union Carbide) and 105.3 parts mineral oil. The materials are heated, under $N_2$, to 160° C. and are held at temperature for 5 hours, cooled to 145° C. and filtered. The filtrate contains 1.77% N.

EXAMPLE P-4

A reactor is charged with 2845 parts of the product of Example B-13, 148.8 parts HPA-X polyamine bottoms and 99.3 parts mineral oil. The materials are heated, under $N_2$, to 180° C. and are held at 180° C. for a total of 9 hours, then cooled to 145° C. and filtered.

EXAMPLE P-5

A reactor is charged with 2381 parts of the product of Example B-11 and 860 parts mineral oil. The materials are heated to 110° C. whereupon 123 parts HPA-X polyamines are added. The temperature is held at 110° C. for 1 hour then is increased to 160° C. and is held at 160° C. for 6 hours while collecting about 19 parts aqueous distillate. The hot materials are filtered yielding an oil solution of a 1 C=O:1.1N reaction product.

EXAMPLE P-6

A solution is prepared by mixing 1220 parts of the product of Example P-5 and 244 parts of mineral oil (Mobil 100N).

EXAMPLE P-7

Following essentially the procedure of Example P-5, a 50% in oil solution of a 1 C=O:1.5N reaction product is obtained.

EXAMPLE P-8

Following essentially the procedure of Example P-5, a solution of 53 parts of the product of Example B-7 in 43.85 parts mineral oil is reacted with 4.35 parts of a mixture of 15 parts diethylenetriamine and 85 parts E-100 amine bottoms.

EXAMPLE P-9

The procedure of Example P-8 is repeated with 56.8 parts of the product of Example B-7, 38.8 parts mineral oil and 6.1 parts of the mixture of amines.

EXAMPLE P-10

A reactor is charged with 720 parts mineral oil and 1000 parts of the $N_2$ blown product of Example B-7 while mixing under an $N_2$ purge. The temperature is adjusted to 88° C. followed by addition of 111.3 parts of the product obtained by reacting 1000 parts of an ethylene polyamine bottoms identified as HPA-X (Union Carbide) and 613 parts of 40% aqueous tris-hydroxymethylamino-methane (THAM) under $N_2$ purge in the presence of 15.9 parts 85% aqueous phosphoric acid at 177° C. with reflux of the amine while allowing water to be removed from the system then at 227° C.–232° C. for 10 hours while refluxing the amines, stripping at 232–238° C. for 6 hours, then rapidly cooling to 93°, water washing and neutralization of the catalyst with 22.1 parts 50% aqueous NaOH. The batch is mixed for 2 hours at 82–96° C., then the temperature is increased to 152° C. over 5.5 hours. At 152° C. the $N_2$ purge is discontinued and submerged $N_2$ is begun. The batch is heated at 149–154° C. until % $H_2O$ is no more than 0.30% by weight. The materials are cooled and filtered at 138–149° C. and adjusted with oil to give total oil of about 40% by weight. The product contains 1.65% N.

As noted hereinabove, the instant invention provides a means for custom making compositions which provide a broad range of characteristics, particularly ranging from compositions which are primarily DVMs to compositions which are primarily VMDs as defined hereinabove. In particular, the compositions of this invention may be prepared employing the esterified interpolymer (A) and the hydrocarbyl substituted carboxylic acid or functional derivative thereof (B) in amounts ranging from about 0.5 to about 99.5 weight % of (A) and about 99.5 to about 0.5 weight % of (B).

In one embodiment, compositions which serve primarily as viscosity modifying dispersants are prepared employing the esterified interpolymer (A) in amounts ranging from about 0.5 to about 30% of the total weight of (A) and hydrocarbyl substituted carboxylic acid or functional derivative thereof (B).

In another embodiment, compositions which serve primarily as viscosity modifiers with dispersant properties are prepared employing the esterified interpolymer (A) in amounts ranging from about 60 to about 99.5% of the total weight of (A) and (B) hydrocarbyl substituted carboxylic acid or functional derivative thereof.

When the preformed reaction product of (B) and (C) is used, it is used such that the amounts of (B) making up the preformed product fall within the above-stated ranges.

The compositions of this invention may be prepared by reacting the esterified interpolymer (A) with the carboxylic acid or functional derivative thereof (B) and the amine (C) simultaneously or in any order or, alternatively, wherein the esterified interpolymer (A) is reacted with the preformed reaction product of hydrocarbyl substituted carboxylic acid or functional derivative thereof (B) and amine (C).

The reaction is typically conducted at an elevated temperature under atmospheric pressure, removing volatile by-products of reaction by means known in the art such as by blowing the reaction mixture with an inert gas or by stripping under reduced pressure. Reaction temperatures above ambient, usually ranging from about 100° C. up to the lowest decomposition temperature of any reactant, more often from about 100° C., frequently from about 120° up to about 200° C., more often from about 120° up to about 170° C. While the reaction may also be conducted under superatmospheric pressure or under reduced pressure, no advantage is apparent, and it is convenient to conduct the reaction at atmospheric pressure. Under some circumstances, for example when about 20% by weight of reactant (A) is employed, the product of the reaction may become very thick or gel-like. It has been found that the addition of a small amount, often as little as 2–3% by weight of additional diluent oil, for example a mineral oil of lubricating viscosity, tends to ameliorate this problem.

The following examples are intended to illustrate several compositions of this invention as well as means for preparing same. Unless indicated otherwise all parts are parts by weight, filtrations are conducted employing a diatomaceous earth filter aid, and analytical values are by actual analysis. Viscosity is at 100° C. using ASTM Procedure D-445 and is reported in centistokes, TAN is total acid number obtained using phenolphthalein indicator and TBN is total base number determined by a potentiometric titration using perchloric acid. Viscosities are measured using ASTM procedure D-445 and are expressed in centistokes. It is to be understood that these examples are not intended to limit the scope of the invention.

EXAMPLES 1–7

The products of Examples A-1 and P-1 are reacted, under $N_2$ purge, in the amounts (parts by weight) and under the conditions indicated in the following Table.

|  | Example | | | | | | |
| --- | --- | --- | --- | --- | --- | --- | --- |
|  | 1 | 2 | 3 | 4 | 5 | 6 | 7 |
| A-1 | 20.8 | 70 | 16.93 | 10 | 10 | 40 | 30 |
| P-1 | 180.3 | 630 | 150 | 190 | 190.3 | 160.3 | 170 |
| Temp (° C.) | 160 | 160 | 160 | 160 | 160 | 160 | 160 |
| Time (Hr.) | 2 | 2 | 6 | 6 | 2 | 0.25 | 2 |
| Viscosity | 542 | 557 | 528 | 263 | 226 | gel | 2082 |
| TBN | 21.1 | 22.7 | 18.6 | 21.4 | 23.3 | — | 18.9 |
| TAN | 1.53 | 1.49 | 1.05 | 0.96 | 1.03 | — | 1.78 |

EXAMPLES 8–12

In each example, HPA-X polyamine bottoms is added, subsurface and dropwise at about 110° C. over 0.25 hour for each of Examples 8, 10 and 12, 0.5 hour for Example 11 and over 0.7 hour for Example 9, to a mixture of the product of Example B-11, mineral oil and the product of the indicated Example of esterified interpolymers in the amounts (parts by weight) in the following Table and reacted for 2 hours at 160° C., while removing aqueous distillate.

|  | Example | | | | |
| --- | --- | --- | --- | --- | --- |
|  | 8 | 9 | 10 | 11 | 12 |
| A-2 | 35.5 | | | | |
| A-3 | | 606 | | 212 | |
| A-4 | | | 84 | | 137 |
| B-11 | 100 | 1022 | 441 | 353 | 441 |
| HPA-X | 5.17 | 53 | 22.8 | 24.9 | 22.8 |
| Mineral Oil | 100.7 | 788 | 283 | 275 | 283 |
| Viscosity | 200 | 368 | 170 | 256 | 835 |
| TBN | 14.9 | 15.2 | 20.1 | 24 | 18.7 |
| TAN | | 3.5 | | 1.67 | 2.7 |

EXAMPLE 13

The procedure of Example 6 is followed except the reaction is conducted in the presence of 10 parts mineral oil (PetroCanada 100N). The product is viscous but is not a gel. Viscosity=3447.7 centistokes.

EXAMPLE 14

A reactor is charged with 180 parts of the product of Example P-4 and 20 parts of the product of Example A-1. The materials are heated under $N_2$ blanket for 2 hours. TBN=26.98; viscosity=790.8 centistokes.

EXAMPLE 15

A reactor is charged with 700 parts of the product of Example P-6, the material is heated to 110° C. whereupon 175 parts of the product of Example A-S are added. The temperature is increased to 160° C. and is maintained for 2 hours under $N_2$. TAN=3.0.

EXAMPLE 16

A mixture of 150 parts of the product of Example P-6 and 10.5 parts mineral oil is heated to 110° C. whereupon 52.5 parts of the product of Example A-3 are charged. The temperature is increased to 160° C. and is maintained for 2 hours under $N_2$. TAN=2.5, TBN=14.2, viscosity=259.55.

EXAMPLE 17

The procedure of example 16 is repeated with 200 parts of the product of Example P-6, 5.6 parts mineral oil and 30.4 parts of the product of Example A-3. TAN=2.4, TBN=17.3, viscosity=126.

EXAMPLE 18

The procedure of example 16 is repeated with 100 parts of the product of Example P-7, 14.4 parts mineral oil and 72 parts of the product of Example A-3. TAN=1.23, TBN=16.6 and viscosity=584

EXAMPLE 19

The procedure of example 16 is repeated with 114 parts of the product of Example P-7, 8 parts mineral oil and 40 parts of the product of Example A-3. TAN=1.86, TBN=22.4 and viscosity=200.

EXAMPLE 20

A reactor is charged with 100 parts of the product of Example B-10, 24 parts of the product of Example A-2 and 131.8 parts mineral oil (PetroCanada 100N). The materials are heated to 110° C. and mixed, under $N_2$, for 0.5 hour. To this solution, 7.8 parts HPA-X polyamine bottoms are added dropwise, subsurface over 0.5 hour while maintaining temperature. The temperature is increased to 160° C., is held at temperature for 4 hours, then the materials are filtered. TAN=0.57; TBN=24.1; Viscosity=218.7 centistokes.

EXAMPLE 21

A reactor is charged with 800 parts of the product of Example A-6 and 160 parts PetroCanada 100N which is heated under $N_2$ purge to 130° C., whereupon 107 parts of the product of Example P-1 are charged. Heating is continued to 160° C. and the temperature is maintained for 2 hours yielding a very viscous product.

EXAMPLE 22

A solution is prepared by mixing for 0.5 hour at 120° C. 96 parts of the product of Example 19 and 4 parts of polyethylene glycol dilaurate (Stepan Chemicals). Viscosity=1690.

EXAMPLE 23

The procedure of Example 21 is followed using 300 parts of PetroCanada 100N. Viscosity=967.

EXAMPLE 24

A solution is prepared as in Example 22 using 96 parts of the product of Example 21. Viscosity=687.

EXAMPLE 25

The procedure of Example 21 is followed using 350 parts of the product of Example A-7, 120 parts mineral oil and 50 parts of the product of Example P-1. Viscosity=594.

EXAMPLES 26–27

The products of Examples A-8 and P-8 are reacted for 1 hour, under $N_2$ purge, in the amounts (parts by weight) and the temperatures indicated in the following Table.

| Example | 26 | 27 |
| --- | --- | --- |
| A-8 | 200 | 250 |
| P-8 | 50 | 100 |
| Temp (° C.) | 155 | 170 |
| Viscosity | — | 1452 |

EXAMPLE 28

A reactor is charged with 300 parts of the product of Example A-8 and 20 parts of the product of Example P-9. The materials are reacted for a total of 2 hours at 160–170° C. The materials are mixed at 120° C. with 36 parts diphenylalkane (Vista Chemical) and filtered. Viscosity @ 100° C.=1267 centistokes.

EXAMPLES 29–32

The products of Examples A-9 and P-8 are reacted, under $N_2$ purge, in the amounts (parts by weight) and under the conditions indicated in the following Table. After reaction, each product is mixed with the indicated amount of diphenylalkane (DPA).

| Example | 29 | 30 | 31 | 32 |
|---|---|---|---|---|
| A-9 | 240 | 250 | 280 | 240 |
| P-8 | 40 | 25 | 20 | 12 |
| DPA | 28 | 28 | 30 | 40 |
| Temp. | 160 | 160 | 155 | 150 |
| Time (Hr.) | 2 | 2 | 2 | 2 |
| Viscosity | 1379 | 990 | 528 | 263 |

EXAMPLE 33

A mixture of 100 parts of the product of Example A-9 and 16 parts of the product of Example B-7 is heated, under $N_2$ purge, to 80° C. whereupon 0.72 part diethylentriamine is rapidly added. The temperature is increased to 155° C. over 0.5 hour and is maintained for 1.5 hours. The temperature is reduced to 125° C., 16 parts diphenylalkane are added followed by stirring for 0.5 hour.

EXAMPLE 34

A reactor charged with 200 parts of the product of Example A-9 is heated, with $N_2$ sparge, to 100° C. followed by addition of 10 parts of the product of Example P-10 and 24 parts of diphenylalkane. The materials are heated to 150° C. and are maintained at 150° C. for 2 hours. Viscosity @ 100° C.=1732 centistokes.

EXAMPLES 35–37

The products of Examples A-4 and P-6 are reacted, under $N_2$ purge, at 160° C. for 2 hours in the amounts (parts by weight) indicated in the following Table.

| Example | 35 | 36 | 37 |
|---|---|---|---|
| A-4 | 62.5 | 200 | 147.8 |
| P-6 | 150 | 800 | 800 |
| Viscosity | 3396 | 495 | 299 |
| TBN | 13.7 | 16.2 | 17.6 |
| TAN | 3.92 | 2.3 | 2.3 |

EXAMPLES 38–39

The procedures of Examples 35–37 are repeated employing the reactants indicated in the following table.

| Example | 38 | 39 |
|---|---|---|
| A-5 | 6.12 | 62.5 |
| P-1 | 193.9 | |
| P-6 | | 150 |
| Viscosity | 202 | — |
| TBN | 22.9 | — |
| TAN | 0.9 | — |

EXAMPLES 40–41

The procedure of Example 16 is repeated using the amounts of oil and products of Examples A-2 and P-5 indicated in the following table.

| Example | 40 | 41 |
|---|---|---|
| A-2 | 160 | 87 |
| Oil | 288 | 244 |
| P-5 | 640 | 783 |
| Viscosity | 288 | 89 |
| TBN | 14.11 | 17.5 |
| TAN | 2.55 | 2.24 |

EXAMPLE 42

The procedure of Example 16 is repeated with 100 parts of the product of Example P-6, 72 parts of the product of Example A-3 and 14.4 parts oil. Viscosity=580, TAN=2.3 and TBN=10.11.

EXAMPLE 43

The procedure of Example 16 is repeated replacing the product of Example P-5 with the product of Example P-4.

COMPARATIVE EXAMPLES

The following examples are prepared and analytical values are obtained as set forth in examples 1–7 except the mixing is conducted under blending conditions, i.e., 70° C.:

| Example | Comp-1 | Comp-2 | Comp-3 |
|---|---|---|---|
| A-1 | 19.96 | 70 | 20 |
| P-1 | 180.85 | 630 | 180 |
| Temp. (° C.) | 70 | 70 | 70 |
| Time (Hr.) | 0.5 | 0.5 | 2 |
| Viscosity | 454 | 487 | 492+ |
| TBN | 22.7 | 23 | 23.9 |
| TAN | 2.54 | 2.38 | 2.61 |

Comparing products obtained under reaction conditions with those prepared under blending conditions, it is observed that those prepared under reaction conditions have lower TAN and higher viscosity than do those prepared under blending conditions. Specifically, comparing compositions of Examples 1 and 2 with compositions Comp-1, Comp-2 and Comp-3, it is noted that the TAN of compositions prepared under blending conditions have TAN values which are essentially what would be calculated from the TAN of each reactant combined without reaction.

Other Additives

Additive concentrates and lubricating oil compositions of this invention may contain other additives. The use of such additives is optional and the presence thereof in the compositions of this invention will depend on the particular use and level of performance required. Thus the other additive may be included or excluded.

Compositions often comprise a zinc salt of a dithiophosphoric acid. Zinc salts of dithiophosphoric acids are often referred to as zinc dithiophosphates, zinc O,O-dihydrocarbyl dithiophosphates, and other commonly used names. They are sometimes referred to by the abbreviation ZDP. One or more zinc salts of dithiophosphoric acids may be present in a minor amount to provide additional extreme pressure, anti-wear and anti-oxidancy performance.

Other additives that may optionally be used in the lubricating oils of this invention include, for example, detergents, dispersants, supplemental viscosity improvers, oxidation inhibiting agents, corrosion inhibiting agents, pour point depressing agents, extreme pressure agents, anti-wear agents, color stabilizers and anti-foam agents. The above-mentioned dispersants and supplemental viscosity improvers may be used in addition to the nitrogen containing esters of this invention.

Extreme pressure agents and corrosion and oxidation inhibiting agents which may be included in the compositions of the invention are exemplified by chlorinated aliphatic hydrocarbons, organic sulfides and polysulfides, phosphorus esters including dihydrocarbon and trihydrocarbon phosphites, molybdenum compounds, and the like.

Other oxidation inhibiting agents include materials such as alkylated diphenyl amines, hindered phenols, especially those having tertiary alkyl groups such as tertiary butyl groups in the position ortho to the phenolic —OH group, and others. Such materials are well known to those of skill in the art.

Auxiliary viscosity improvers (also sometimes referred to as viscosity index improvers or viscosity modifiers) may be included in the compositions of this invention. Viscosity improvers are usually polymers, including polyisobutenes, polymethacrylic acid esters, hydrogenated diene polymers, polyalkyl styrenes, esterified styrene-maleic anhydride copolymers, hydrogenated alkenylarene-conjugated diene copolymers and polyolefins. Multifunctional viscosity improvers, other than those of the present invention, which also have dispersant and/or antioxidancy properties are known and may optionally be used in addition to the products of this invention. Such products are described in numerous publications including those mentioned in the Background of the Invention. Each of these publications is hereby expressly incorporated by reference.

Pour point depressants may be included in the additive concentrates and lubricating oils described herein. Those which may be used are described in the literature and are well-known to those skilled in the art; see for example, page 8 of 'Lubricant Additives" by C. V. Smalheer and R. Kennedy Smith (Lezius-Hiles Company Publisher, Cleveland, Ohio, 1967). Pour point depressants useful for the purpose of this invention, techniques for their preparation and their use are described in U.S. Pat. Nos. 2,387,501; 2,015,748; 2,655,479; 1,815,022; 2,191,498; 2,666,748; 2,721,877; 2,721,878; and 3,250,715 which are expressly incorporated by reference for their relevant disclosures.

Anti-foam agents used to reduce or prevent the formation of stable foam include silicones or organic polymers. Examples of these and additional anti-foam compositions are described in "Foam Control Agents", by Henry T. Kerner (Noyes Data Corporation, 1976), pages 125–162.

Detergents and dispersants may be of the ash-producing or ashless type. The ash-producing detergents are exemplified by oil soluble neutral and basic salts of alkali or alkaline earth metals with sulfonic acids, carboxylic acids, phenols or organic phosphorus acids characterized by a least one direct carbon-to-phosphorus linkage.

The term "basic salt" is used to designate metal salts wherein the metal is present in stoichiometrically larger amounts than the organic acid radical. The relative amount of metal present in "basic salts" is frequently indicated by the expression "metal ratio" (abbreviated MR), which is defined as the number of equivalents of metal present compared to a "normal", stoichiometric amount. Thus, for example, a basic salt containing twice the amount of metal compared to the stoichiometric amount, has a metal ratio (MR) of 2. Basic salts and techniques for preparing and using them are well known to those skilled in the art and need not be discussed in detail here.

Ashless detergents and dispersants are so-called despite the fact that, depending on its constitution, the detergent or dispersant may upon combustion yield a nonvolatile residue such as boric oxide or phosphorus pentoxide; however, it does not ordinarily contain metal and therefore does not yield a metal-containing ash on combustion. Many types are known in the art, and any of them are suitable for use in the lubricants of this invention. The following are illustrative:

(1) Reaction products of carboxylic acids (or derivatives thereof) containing at least about 34 and preferably at least about 54 carbon atoms with nitrogen containing compounds such as amine, organic hydroxy compounds such as phenols and alcohols, and/or basic inorganic materials. Examples of these "carboxylic dispersants" are described in British Patent number 1,306,529 and in many U.S. patents including the following:

| | | |
|---|---|---|
| 3,163,603 | 3,399,141 | 3,574,101 |
| 3,184,474 | 3,415,750 | 3,576,743 |
| 3,215,707 | 3,433,744 | 3,630,904 |
| 3,219,666 | 3,444,170 | 3,632,510 |
| 3,271,310 | 3,448,048 | 3,632,511 |
| 3,272,746 | 3,448,049 | 3,697,428 |
| 3,281,357 | 3,451,933 | 3,725,441 |
| 3,306,908 | 3,454,607 | 4,194,886 |
| 3,311,558 | 3,467,668 | 4,234,435 |
| 3,316,177 | 3,501,405 | 4,491,527 |
| 3,340,281 | 3,522,179 | 5,696,060 |
| 3,341,542 | 3,541,012 | 5,696,067 |
| 3,346,493 | 3,541,678 | 5,779,742 |
| 3,351,552 | 3,542,680 | RE 26,433 |
| 3,381,022 | 3,567,637 | |

(2) Reaction products of relatively high molecular weight aliphatic or alicyclic halides with amines, preferably polyalkylene polyamines. These may be characterized as "amrine dispersants" and examples thereof are described for example, in the following U.S. patents:

| | |
|---|---|
| 3,275,554 | 3,454,555 |
| 3,438,757 | 3,565,804 |

(3) Reaction products of alkyl phenols in which the alkyl groups contains at least about 30 carbon atoms with aldehydes (especially formaldehyde) and amines (especially polyalkylene polyamines), which may be characterized as "Mannich dispersants". The materials described in the following U.S. patents are illustrative:

| | |
|---|---|
| 3,413,347 | 3,725,480 |
| 3,697,574 | 3,726,882 |
| 3,725,277 | |

(4) Products obtained by post-treating the carboxylic amine or Mannich dispersants with such reagents as urea, thiourea, carbon disulfide, aldehydes, ketones, carboxylic acids, hydrocarbon-substituted succinic anhydrides, nitriles, epoxides, boron compounds, phosphorus compounds or the like. Exemplary materials of this kind are described in the following U.S. patents:

| | | | |
|---|---|---|---|
| 3,036,003 | 3,282,955 | 3,493,520 | 3,639,242 |
| 3,087,936 | 3,312,619 | 3,502,677 | 3,649,229 |
| 3,200,107 | 3,366,569 | 3,513,093 | 3,649,659 |
| 3,216,936 | 3,367,943 | 3,533,945 | 3,658,836 |
| 3,254,025 | 3,373,111 | 3,539,633 | 3,697,574 |
| 3,256,185 | 3,403,102 | 3,573,010 | 3,702,757 |
| 3,278,550 | 3,442,808 | 3,579,450 | 3,703,536 |
| 3,280,234 | 3,455,831 | 3,591,598 | 3,704,308 |
| 3,281,428 | 3,455,832 | 3,600,372 | 3,708,522 |
| | | | 4,234,435 |

(5) Polymers and copolymers of oil-solubilizing monomers such as decyl methacrylate, vinyl decyl ether and high molecular weight olefins with monomers containing polar substituents, e.g., aminoalkyl acrylates or methacrylates, acrylamides and poly-(oxyethylene)-substituted acrylates. These may be characterized as "polymeric dispersants" and examples thereof are disclosed in the following U.S. patents:

| | |
|---|---|
| 3,329,658 | 3,666,730 |
| 3,449,250 | 3,687,849 |
| 3,519,565 | 3,702,300 |

The above-noted patents are incorporated herein by reference for their disclosures of ashless dispersants.

The above-illustrated additives may each be present in lubricating compositions at a concentration of as little as 0.001% by weight, usually ranging from about 0.01% to about 20% by weight. In most instances, they each contribute from about 0.1% to about 10% by weight, more often up to about 5% by weight.

Additive Concentrates

The various additives described herein can be added directly to the lubricating oil or fuel. Preferably, however, they are diluted with a substantially inert, normally liquid organic diluent such as mineral oil, naphtha, benzene, toluene or xylene, to form an additive concentrate. These concentrates usually comprise about 0.1 to about 80% by weight, frequently from about 1% to about 80% by weight, more often from about 10% to about 80% by weight, of the compositions of this invention and may contain, in addition, one or more other additives known in the art or described hereinabove. Concentrations such as 15%, 20%, 30% or 50% or higher may be employed.

Additive concentrates are prepared by mixing together the desired components, often at elevated temperatures, usually less than 100° C., often no more than about 70° C.

Additive concentrates used for preparing lubricating oil compositions are illustrated by the following examples. The amounts shown are indicated as parts by weight. Unless indicated otherwise, components are indicated as parts or percentages by weight of chemical present on an oil or diluent free basis. When products of Examples set forth hereinabove are used, the amounts listed are as prepared, including diluent, if any.

EXAMPLE AC-1

An additive concentrate is prepared by mixing together 7.6 parts of a zinc salt of mixed isopropyl-methyl amyl (46.8:53.2 by weight) dithiophosphoric acid, 5.45 parts di(nonylphenyl) amine, 2.73 parts of a sulfurized olefin, 2.83 parts of a calcium overbased (MR 3.5) sulfurized alkyl phenol, 1.76 parts of calcium overbased (MR 11) alkyl benzene sulfonic acid, 1.0 part sodium overbased (MR 16) polyisobutylene ($\overline{M}_n$ 950) substituted succinic anhydride, 1.55 parts magnesium overbased (MR 14.7) alkyl benzene sulfonic acid, 49.09 parts of the product of example 2, 0.08 parts of a kerosene solution of a silicone antifoam agent and sufficient mineral oil diluent to bring the total of all ingredients up to 100 parts.

Lubricating Oil Compositions

The compositions of this invention are useful as viscosity improving dispersants or as viscosity improvers with dispersant properties. They are typically used in minor amounts, that is less than 50% by weight of the lubricating oil composition with a major amount of an oil of lubricating viscosity, that is, the oil of lubricating viscosity comprises greater than 50% by weight of the lubricating oil composition.

The Oil of Lubricating Viscosity

The lubricating compositions of this invention employ an oil of lubricating viscosity, including natural or synthetic lubricating oils and mixtures thereof. Mixture of mineral oil and synthetic oils, particularly polyalphaolefin oils and polyester oils, are often used.

Natural oils include animal oils and vegetable oils (e.g. castor oil, lard oil and other vegetable acid esters) as well as mineral lubricating oils such as liquid petroleum oils and solvent-treated or acid treated mineral lubricating oils of the paraffinic, naphthenic or mixed paraffinic-naphthenic types. Hydrotreated or hydrocracked oils are included within the scope of useful oils of lubricating viscosity.

Oils of lubricating viscosity derived from coal or shale are also useful. Synthetic lubricating oils include hydrocarbon oils and halosubstituted hydrocarbon oils such as polymerized and interpolymerized olefins, etc. and mixtures thereof, alkylbenzenes, polyphenyl, (e.g., biphenyls, terphenyls, alkylated polyphenyls, etc.), alkylated diphenyl ethers and alkylated diphenyl sulfides and their derivatives, analogs and homologues thereof and the like.

Alkylene oxide polymers and interpolymers and derivatives thereof, and those where terminal hydroxyl groups have been modified by esterification, etherification, etc., constitute other classes of known synthetic lubricating oils that can be used.

Another suitable class of synthetic lubricating oils that can be used comprises the esters of dicarboxylic acids and those made from $C_5$ to $C_{12}$ monocarboxylic acids and polyols or polyether polyols.

Other synthetic lubricating oils include liquid esters of phosphorus-containing acids, polymeric tetrahydrofurans, alkylated diphenyloxides and the like.

Hydrotreated naphthenic oils are well known.

Many viscosity improvers, and particularly functionalized dispersant viscosity improvers such as acylated polyolefins reacted with amines or alcohols are not readily compatible with certain types of oils of lubricating viscosity, notably polyolefin oils and hydrotreated oils. The dispersant viscosity improvers of this invention display outstanding compatibility with these oils.

Unrefined, refined and rerefined oils, either natural or synthetic (as well as mixtures of two or more of any of these) of the type disclosed hereinabove can be used in the compositions of the present invention. Unrefined oils are those obtained directly from a natural or synthetic source without further purification treatment. Refined oils are similar to the unrefined oils except they have been further treated in one or more purification steps to improve one or more properties. Rerefined oils are obtained by processes similar to those used to obtain refined oils applied to refined oils which have been already used in service. Such rerefined oils often are additionally processed by techniques directed to removal of spent additives and oil breakdown products.

Specific examples of the above-described oils of lubricating viscosity are given in Chamberlin III, U.S. Pat. No. 4,326,972 and European Patent Publication 107,282, both of which are hereby incorporated by reference for relevant disclosures contained therein.

A basic, brief description of lubricant base oils appears in an article by D. V. Brock, "Lubrication Engineering", Volume 43, pages 184–5, March, 1987, which article is expressly incorporated by reference for relevant disclosures contained therein.

The following examples illustrate lubricating oil compositions of this invention. All parts are parts by weight.

EXAMPLE L-1

A 5W-30 lubricating oil composition is prepared by combining 10.4 parts of the additive concentrate of Example AC-1 which contains the product of Example 2, 7.5 parts of a 9% in oil solution of a ethylene-propylene-diene terpolymer viscosity improver, 0.09% of a styrene maleate copolymer neutralized with aminopropylmorpholine, in sufficient mineral oil basestock (Exxon stocks) to prepare 100 parts of lubricant. Viscosity @ 40° C.=58.4; @ 100° C.=10.28.

COMPARATIVE EXAMPLE L-1

Example L-1 is repeated replacing the additive concentrate AC-1 with an additive concentrate identical in every respect except replacing the composition of Example 2 with that of Example Comp-1. Viscosity @ 40° C.=56.24; @ 100° C.=9.82. It is apparent from Example L-1 and Comparative Example L-1 that in otherwise identical lubricating oil compositions greater viscosities are observed using composition prepared under reaction conditions compared to one prepared under blend conditions.

It is known that some of the materials described above may interact in the final formulation, so that the components of the final formulation may be different from those that are initially added. For instance, metal ions (of, e.g., a detergent) can migrate to other acidic sites of other molecules. The products formed thereby, including the products formed upon employing the composition of the present invention in its intended use, may not susceptible of easy description. Nevertheless, all such modifications and reaction products are included within the scope of the present invention; the present invention encompasses the composition prepared by admixing the components described above.

Each of the documents referred to above is incorporated herein by reference. Except in the examples, or where otherwise explicitly indicated, all numerical quantities in this description specifying amounts of materials, reaction conditions, molecular weights, number of carbon atoms, and the like, are to be understood as modified by the word "about." Unless otherwise indicated, each chemical or composition referred to herein should be interpreted as being a commercial grade material which may contain the isomers, by-products, derivatives, and other such materials which are normally understood to be present in the commercial grade. However, the amount of each chemical component is presented exclusive of any solvent or diluent oil which may be customarily present in the commercial material, unless otherwise indicated. It is to be understood that the upper and lower amount, range, and ratio limits set forth herein may be independently combined. As used herein, the expression "consisting essentially of" permits the inclusion of substances which do not materially affect the basic and novel characteristics of the composition under consideration.

While the invention has been explained in relation to its preferred embodiments, it is to be understood that various modifications thereof will become apparent to those skilled in the art upon reading the specification. Therefore, it is to be understood that the invention disclosed herein is intended to cover such modifications that fall within the scope of the appended claims.

What is claimed is:

1. A composition prepared by reacting
   (A) an esterified carboxy-containing interpolymer, said interpolymer being derived from at least two monomers, (i) one of said monomers being at least one vinyl aromatic monomer and (ii) the other of said monomers being at least one alpha, beta-unsaturated acylating agent, and having, before esterification, $\overline{M}_n$ determined by gel permeation chromatography ranging from about 8,000 to about 350,000, wherein from about 80% to about 99% of the carboxylic groups of said interpolymer are esterified, wherein from about 80 to about 100% of the ester groups contain from 8 to about 23 carbon atoms and from 0 to about 20% of the ester groups contain from 2 to 7 carbon atoms, with
   (B) a hydrocarbyl substituted carboxylic acid or functional derivative thereof wherein the hydrocarbyl group comprises from about 10 to about 400 carbon atoms, and
   (C) an amine having an average of more than 1 condensable N—H group, in any order or simultaneously, or with the preformed reaction product of (B) and (C) wherein said preformed reaction product has at least one condensable N—H group.

2. The composition of claim 1 wherein said esterified groups of interpolymer (A) are characterized by the presence of at least one member of the group consisting of
   (a) pendant ester groups containing from about 12 to about 23 carbon atoms, and
   (b) pendant ester groups containing from 8 to about 11 carbon atoms; and optionally,
   (c) up to about 20 mole % of pendant ester groups containing from 2 to 7 carbon atoms, based on the total number of moles of carboxylic groups in said interpolymer.

3. The composition of claim 2 wherein said esterified groups of interpolymer (A) are characterized by the presence of each of the following groups which are derived from the carboxy groups of said interpolymer:
   (a) from about 20 to about 80 mole % of pendant ester groups containing from about 12 to about 23 carbon atoms,
   (b) from about 80 to about 20 mole % of pendant ester groups containing from 8 to about 11 carbon atoms, and optionally,
   (c) up to about 20 mole % of pendant ester groups containing from 2 to 7 carbon atoms, all based on the total number of moles of carboxylic groups in said interpolymer.

4. The composition of claim 1 wherein the $\overline{M}_n$ of the interpolymer, before esterification, ranges from about 10,000 to about 100,000.

5. The composition of claim 1 wherein the vinyl aromatic monomer comprises styrene or a substituted styrene.

6. The composition of claim 1 wherein the alpha,beta-unsaturated acylating agent comprises an aliphatic carboxylic acid or anhydride, or esters thereof.

7. The composition of claim 1 wherein the alpha, beta-unsaturated acylating agent comprises at least one member selected from the group consisting of maleic acid or anhydride, itaconic acid or anhydride, fumaric acid, α-methylene glutaric acid, acrylic acid, methacrylic acid and esters of any of these.

8. The composition of claim 1 wherein the interpolymer is derived from styrene and maleic anhydride.

9. The composition of claim 8 wherein the interpolymer is further derived from methacrylic acid or an ester thereof.

10. The composition of claim 1 wherein the mole ratio of (i):(ii) ranges from about 1:2 to about 3:1.

11. The composition of claim 9 wherein the mole ratio of styrene:maleic anhydride:methacrylic acid or ester thereof ranges from about (1–3):(2–1):(0.01–0.3).

12. The composition of claim 11 wherein the mole ratio of styrene:maleic anhydride:methacrylic acid or ester thereof is about 1:1:0.05.

13. The composition of claim 1 wherein the esterified carboxy containing interpolymer (A) comprises up to about 15 mole % based on moles of carboxy groups in said interpolymer of pendant carboxylic acid or anhydride groups.

14. The composition of claim 1 wherein the esterified interpolymer (A) is substantially free of ester groups containing from 2 to 7 carbon atoms.

15. The composition of claim 1 wherein the hydrocarbyl substituted carboxylic acid or functional derivative thereof (B) is a polyolefin substituted carboxylic acid.

16. The composition of claim 15 wherein the polyolefin substituted carboxylic acid or functional derivative thereof has from about 1 to about 4 carboxy groups per mole of polyolefin.

17. The composition of claim 15 wherein the polyolefin substituent is derived from homopolymerized and interpolymerized olefins containing from 2 to about 18 carbon atoms.

18. The composition of claim 17 wherein the polyolefin substituent is derived from a polybutene.

19. The composition of claim 18 wherein the polybutene comprises polyisobutylene.

20. The composition of claim 1 wherein the hydrocarbyl substituent on (B), the hydrocarbyl substituted carboxylic acid or functional derivative thereof, has a number average molecular weight ranging from about 500 to about 4000.

21. The composition of claim 1 wherein (B) the hydrocarbyl substituted carboxylic acid or functional derivative thereof compris es a succinic acid or anhydride thereof.

22. The composition of claim 1 wherein (B) the hydrocarbyl substituted carboxylic acid or functional derivative thereof comprises an α-hydroxy acid or ester thereof.

23. The composition of claim 1 wherein (B) the hydrocarbyl substituted carboxylic acid or functional derivative thereof comprises an α-hydroxy lactone.

24. The composition of claim 1 wherein the amine (C) is an alkylene polyamine.

25. The composition of claim 24 wherein the alkylene polyamine comprises ethylene polyamine bottoms.

26. The composition of claim 1 wherein the composition is prepared in the presence of a substantially inert organic diluent.

27. The composition of claim 26 wherein the diluent is used in amounts ranging from about 20% to about 80% by weight of the total weight of the composition.

28. The composition of claim 26 wherein the diluent is at least one member selected from the group consisting of mineral oils, alpha olefin oligomers, vegetable oils, alkylated aromatic oils, synthetic carboxylic ester oils, and polyalkylene oxides.

29. The composition of claim 1 wherein the esterified interpolymer (A) and the hydrocarbyl substituted carboxylic acid or functional derivative thereof (B) are used in amounts ranging from about 0.5 to about 99.5 weight % of (A) and about 99.5 to about 0.5 weight % of (B).

30. The composition of claim 29 wherein the esterified interpolymer (A) is used in amounts ranging from about 0.5 to about 30 weight % of the total weight of (A) and hydrocarbyl substituted carboxylic acid or functional derivative thereof (B).

31. The composition of claim 29 wherein the esterified interpolymer (A) is used in amounts ranging from about 60 to about 99.5 weight % of the total weight of (A) and (B) hydrocarbyl substituted carboxylic acid or functional derivative thereof.

32. The composition of claim 1 wherein the esterified interpolymer (A) is reacted with the preformed reaction product of hydrocarbyl substituted carboxylic acid or functional derivative thereof (B) and amine (C).

33. The composition of claim 1 wherein the esterified interpolymer (A) is mixed with the hydrocarbyl substituted carboxylic acid or functional derivative thereof (B) and the mixture of (A) and (B) is subsequently reacted with the amine (C).

34. The composition of claim 1 wherein the amine (C) is used in amounts ranging from about 0.7 equivalents up to about 2 moles per equivalent of carboxylic acid or functional derivative (B).

35. A process comprising reacting (A) an esterified carboxy-containing interpolymer, said interpolymer being derived from at least two monomers, (i) one of said monomers being at least one vinyl aromatic monomer and (ii) the other of said monomers being at least one alpha, beta-unsaturated acylating agent, and having, before esterification, $\overline{M}_n$ determined by gel permeation chromatography ranging from about 8,000 to about 350,000, wherein from about 80% to about 99% of the carboxylic groups of said interpolymer are ester groups, wherein from about 80 to about 100% of said ester groups contain from 8 to about 19 carbon atoms and from 0 to about 20% of said ester groups contain from 2 to 7 carbon atoms, with (B) a hydrocarbyl substituted carboxylic acid or functional derivative thereof wherein the hydrocarbyl group comprises from about 10 to about 400 carbon atoms, and (C) an amine having at least 1 condensable N—H group, said reacting being conducted in any order or simultaneously, or with the preformed reaction product of (B) and (C) wherein said preformed reaction product has at least one condensable N—H group.

36. The process of claim 35 wherein the esterified interpolymer (A) is reacted with the preformed reaction product of hydrocarbyl substituted carboxylic acid or functional derivative thereof (B) and amine (C).

37. The process of claim 35 wherein the esterified interpolymer (A) is mixed with the hydrocarbyl substituted carboxylic acid or functional derivative thereof (B) and the mixture of (A) and (B) is subsequently reacted with the amine (C).

38. The process of claim 35 wherein the amine (C) is used in amounts ranging from about 0.7 equivalents up to about 2 moles per equivalent of carboxylic acid or functional derivative (B).

39. An additive concentrate comprising from about 10 to about 90% by weight of a substantially inert, normally liquid organic diluent and from about 90 to about 10% by weight of the composition of claim 1.

40. A lubricating oil composition comprising a major amount of an oil of lubricating viscosity and a minor amount of the composition of claim 1.

* * * * *